(12) United States Patent
Unger et al.

(10) Patent No.: US 11,756,174 B2
(45) Date of Patent: Sep. 12, 2023

(54) SYSTEM AND METHOD FOR REAL-TIME TONE-MAPPING

(71) Applicant: Faurecia Irystec Inc., Montreal (CA)

(72) Inventors: Jonas Unger, Norrköping (SE); Gabriel Eilertsen, Norrköping (SE); Rafal Mantiuk, Cambridge (GB)

(73) Assignee: FAURECIA IRYSTEC INC., Montreal (CA)

( * ) Notice: Subject to any disclaimer, the term of this patent is extended or adjusted under 35 U.S.C. 154(b) by 103 days.

(21) Appl. No.: 17/320,689

(22) Filed: May 14, 2021

(65) Prior Publication Data

US 2021/0272251 A1 Sep. 2, 2021

Related U.S. Application Data

(63) Continuation of application No. 15/757,154, filed as application No. PCT/CA2016/051043 on Sep. 2, 2016, now Pat. No. 11,107,204.

(Continued)

(51) Int. Cl.
*G06V 10/00* (2022.01)
*G06T 5/00* (2006.01)

(52) U.S. Cl.
CPC .... *G06T 5/009* (2013.01); *G06T 2207/10024* (2013.01); *G06T 2207/20076* (2013.01); *G06T 2207/20208* (2013.01)

(58) Field of Classification Search
CPC ........... G06T 5/001; G06T 5/20; G06T 5/006; G06T 5/009; G06T 3/40; G06T 3/60;

(Continued)

(56) References Cited

U.S. PATENT DOCUMENTS 8,026,935 B2 * 9/2011 Tsai .................... G09G 3/3406
345/102
8,120,570 B2 2/2012 Kerofsky
(Continued)

FOREIGN PATENT DOCUMENTS

EP 2750101 A1 7/2014

OTHER PUBLICATIONS

G. Eilertsen et al., "Real-time noise-aware tone mapping", ACM Transactions on Graphics (TOG), vol. 34, No. 6, dated Oct. 26, 2015, pp. 1-15.

(Continued)

*Primary Examiner* — Amir Alavi
(74) *Attorney, Agent, or Firm* — REISING ETHINGTON P.C.

(57) ABSTRACT

A method and system for tone-mapping an image includes determining a tone-curve based on a model of image contrast distortion between the input image and a tone-mapped image and tone-mapping the input image according to the determined tone-curve. Determining the tone curve includes analytically calculating values of the tone-curve that reduce the image contrast distortion within the model of image contrast distortion. A tone-mapping operator includes a noise model generator and a tone-mapping module operable to receive one or more contextual parameters. The tone-mapping module includes an edge-stopping filtering submodule for extracting a base layer and detail layer of the input image, a tone-curve generating submodule and a combining submodule for combining the base layer and detail layer. At least one of the edge-stopping filtering submodule, the tone-curve generating submodule and combining submodule is adjustable based on the contextual parameters.

15 Claims, 17 Drawing Sheets

Related U.S. Application Data

(60) Provisional application No. 62/213,290, filed on Sep. 2, 2015.

(58) Field of Classification Search
CPC ............. G06T 1/60; G06T 2207/20076; G06T 2207/20208; G06K 9/40; G06K 9/00228; G06F 17/148; H04N 7/26888; H04N 1/4097
See application file for complete search history.

(56) References Cited

U.S. PATENT DOCUMENTS

| | | | |
|---|---|---|---|
| 8,478,064 B2* | 7/2013 | Kass | G06T 5/20 382/263 |
| 8,577,169 B2* | 11/2013 | Andrus | H04N 21/4318 382/302 |
| 8,917,336 B2 | 12/2014 | Cote et al. | |
| 8,958,658 B1 | 2/2015 | Lim et al. | |
| 8,965,141 B2* | 2/2015 | Jiang | G06T 5/002 382/261 |
| 9,177,509 B2 | 11/2015 | Kerofsky et al. | |
| 9,230,312 B2* | 1/2016 | Paris | G06T 5/009 |
| 9,361,679 B2* | 6/2016 | Aydin | H04N 19/85 |
| 9,378,543 B2* | 6/2016 | Aydin | G06T 5/50 |
| 9,742,963 B2 | 8/2017 | Borg | |
| 9,857,953 B2 | 1/2018 | Sunkavalli et al. | |
| 10,217,197 B2 | 2/2019 | Mantiuk et al. | |
| 10,547,871 B2* | 1/2020 | Aydin | H04N 19/80 |
| 10,692,191 B2 | 6/2020 | Smirnov | |
| 11,107,204 B2* | 8/2021 | Unger | H04N 1/6027 |
| 2002/0176120 A1* | 11/2002 | O'Callaghan | H04N 1/3878 358/453 |
| 2009/0027558 A1 | 1/2009 | Mantiuk et al. | |
| 2013/0121572 A1 | 5/2013 | Paris et al. | |
| 2013/0250123 A1* | 9/2013 | Zhang | H04N 5/332 348/164 |
| 2014/0184916 A1 | 7/2014 | Steiner | |
| 2015/0078661 A1 | 3/2015 | Granados et al. | |
| 2015/0181186 A1 | 6/2015 | Lim et al. | |
| 2016/0027161 A1* | 1/2016 | Aydin | H04N 19/117 382/162 |
| 2019/0080670 A1 | 3/2019 | Jung et al. | |

OTHER PUBLICATIONS

Durand et al., "Fast Bilateral Filtering for the Display of High-Dynamic-Range Images", ACM Transactions on Graphics, dated Jul. 1, 2002, pp. 257-266.

European Office Action for European Application No. 21196068.7, dated Nov. 29, 2021, 11 pages.

Display adaptive tone mapping. Rafal Mantiuk, Daly Scott, Kerofsky Louis. ACM Transactions on Graphics,,Aug. 1, 2008. ACM, NY, US. vol: 27. Nr: 3, pp. 68.1-68.10.

Real-time noise-aware tone mapping. Gabriel Eilertsen, Rafal K Mantiuk, Jonas Unger. ACM Transactions on Graphics,,Oct. 26, 2015,ACM, NY, US. vol. 34, Nr: 6, pp. 1-15.

Adams et al. 2009. Gaussian KD-Trees for Fast High-Dimensional Filtering, ACM Trans. Graphics 28, 3, 21:1-21:12.

Adams et al. 2010. Fast High-Dimensional Filtering Using the Permutohedral Lattice, Com-puter Graphics Forum 29, 2, 753-762.

Allred et al. 2012. Light-ness perception in high dynamic range images: Local and remote luminance effects. Journal of Vision 12, 2, 1-16.

Aubry et al. 2014. Fast local laplacian filters: Theory and applications. ACM Trans. Graphics 33, 5, 167:1-167:14.

Aurich et al. 1995. Non-linear gaussian filters performing edge preserving diffusion. In DAGM-Symposium, Springer, G. Sagerer, S. Posch, and F. Kummert, Eds., Informatik Aktuell, 538-545.

Aydin et al. 2014. Temporally coherent local tone-mapping of HDR video. ACM Trans. Graphics 33, 6, 1-13.

Baek et al., 2010. Accelerating spatially vary-ing gaussian filters. ACM Trans. Graphics 29, 6, 169:1-169:10.

Banterle et al. 2012. A low-memory, straightforward and fast bilateral filter through subsampling in spatial domain. Computer Graphics Fo-rum 31, 1, 19-32.

Barash. 2002. Fundamental relationship between bilateral filtering, adaptive smoothing, and the nonlinear diffusion equa-tion. IEEE Trans. Pattern Analysis and Machine Intelligence 24, 6, 844-847.

Bennett et al. 2005. Video enhancement using per-pixel virtual exposures. ACM Trans. Graphics 24, 3, 845-852.

Berns, 1996. Methods for characterizing CRT displays. Displays 16, 4, 173-182.

Black et al. 1998. Robust anisotropic diffusion. Trans. Image Processing 7, 3, 421-432.

Boitard et al. 2012. Temporal coherency for video tone-map-ping. In Proc. SPIE 8499, Applications of Digital Image Pro-cessing XXXV, 84990D-84990D-10.

Boitard et al. 2014. Zonal brightness coherency for video tone-mapping. Sig-nal Processing: Image Communication 29, 2, 229-246.

Chen et al. 2007. Real-time edge-aware image processing with the bilateral grid. ACM Trans. Graphics 26, 3, 103:1-103:9.

Choudhary et al. 2003. The trilateral filter for high contrast images and meshes. In Proc. Eurographics work-shop on Rendering 14, 186-196.

Drago et al. 2003. Adaptive logarithmic mapping for displaying high con-trast scenes. Computer Graphics Forum 22, 419-426.

Durand et al. 2002. Fast bilateral filtering for the display of high-dynamic-range images. ACM Trans. Graphics 21, 3, 257-266.

Eilertsen et al. 2013. Evaluation of Tone-mapping Operators for HDR-Video.Computer Graphics Forum 32, 7, 275-284.

European Search Report dated Mar. 18, 2019, issued by the European Patent Office in corresponding European application No. 16840480.4 (pp. 1-15).

Extended European Search Report dated Jun. 25, 2019, issued by the European Patent Office in corresponding European application No. 16840480.4 (pp. 1-13).

Foi et al. 2008. Practical poissonian-gaussian noise modeling and fit-ting for single-image raw-data. IEEE Trans. Image Processing 17, 10, 1737-1754.

Froelich et al. 2014. Creating Cine-matic Wide Gamut HDR-Video for the Evaluation of Tone-map-ping Operators and HDR-Displays. In Proc. SPIE 9023, Digital Photography X, 90230X-90230X-10.

Van Hateren, Encoding of High Dynamic Range Video With a Model of Human Cones, Acm transactions on graphics, 25(4), 1380-1399. Publication date: 2006.

Irawan et al. 2005. Perceptually based tone-mapping of high dynamic range image streams. In Proc. Eurographics Conference on Rendering Tech-niques 16, 231-242.

Kiser et al. 2012. Real time automated tone-mapping system for HDR video. In Proc. IEEE International Conference on Image Processing 19, 2749-2752.

Kronander et al. 2013. Unified HDR reconstruction from raw CFA data. In Proc. IEEE International Conference on Computational Photography 5, 1-9.

Ward Larson et al., A Visibility Matching Tone Reproduction Operator for Hugh Dynamic Range Scenes, Jan. 1997.

Edda et al. 2004. A local model of eye adaptation for high dynamic range images. In Proc. International Conference on Computer Graphics, Virtual Reality, Visualisation and Interaction in Africa 3, 151-160.

Maggioni et al. 2012. Video denoising, deblocking, and enhancement through separable 4-d nonlocal spatiotemporal transforms. IEEE Trans. Image Processing 21, 9, 3952-3966.

Mai et al. 2011. Optimizing a tone-curve for backward-compatible high dynamic range image and video compression. IEEE Trans. Image Processing 20, 6, 1558-1571.

Mantiuk et al. 2008. Display adaptive tone-mapping. ACM Trans. Graphics 27, 3, 68:1-68:10.

Mantiuk et al. 2009. Color correction for tone-mapping. Com-puter Graphics Forum 28, 2, 193-202.

(56) References Cited

OTHER PUBLICATIONS

Mantiuk et al. 2011. Hdr-vdp-2: A calibrated visual metric for visibility and quality predictions in all luminance conditions. ACM Trans. Graphics 30, 4, 40:1-40:14.
Milanfar, 2013. A tour of modern image filtering: New in-sights and methods, both practical and theoretical. IEEE Signal Processing Magazine 30, 1, 106-128.
Office Action dated Aug. 5, 2020, issued by the CNIPA in corresponding Chinese application No. 201680063702.1 (pp. 1-5).
Pattanaik et al. 2000. Time-dependent visual adaptation for fast realis-tic image display. In Proc. SIGGRAPH 00, Annual Conference Series, 47-54.
Perona et al. 1990. Scale-space and edge detec-tion using anisotropic diffusion. IEEE Trans. Pattern Analysis Machine Intelligence 12, 7, 629-639.
Reinhard et al. 2005. Dynamic range reduction inspired by photoreceptor physiology. IEEE Trans. Visualization and Computer Graphics 11, 1, 13-24.
Takeda et al. 2007. Higher order bilateral filters and their properties. Proc. SPIE 6498, Computational Imaging V, 64980S-64980S-9.
Takeda et al. 2007. Kernel regression for image processing and reconstruction. IEEE Trans. Image Processing 16, 2, 349-366.
Tocci et al. 2011. A versatile hdr video production system. ACM Trans. Graphics 30, 4, 41:1-41:10.
Tomais et al. 1998. Bilateral filtering for gray and color images. In Proc. International Conference on Computer Vision 6, 839-846.
Yang, 2012. Recursive bilateral filtering. In Proc. European Conference on Computer Vision 12, 399-413.
Yoshizawa et al., 2010. Fast gauss bilateral filtering. Computer Graphics Forum 29, 1, 60-74.

\* cited by examiner (a) Ground truth (b) BF, MSE = 17.0

(c) AD, MSE = 5.53

(d) TF, MSE = 6.07

(e) FLL, MSE = 3.78

(f) Our approach, MSE = 4.15

SYSTEM AND METHOD FOR REAL-TIME TONE-MAPPING

RELATED PATENT APPLICATION

The present application is a continuation of U.S. application Ser. No. 15/757,154, filed Mar. 2, 2018, which is a U.S. national stage application of International Application No. PCT/CA2016/051043, filed Sep. 2, 2016, which claims priority from U.S. provisional patent application No. 62/213,290, filed Sep. 2, 2015 and entitled "SYSTEM AND METHOD PERFORMING REAL-TIME NOISE-AWARE TONE-MAPPING", the disclosure of which is hereby incorporated by reference in its entirety.

TECHNICAL FIELD

The following relates to systems and methods for performing tone-mapping of an input image, and more particularly, for performing tone-mapping based on image contrast distortion.

BACKGROUND

High dynamic range (HDR) video will offer unprecedented improvements in viewing experiences for high end cinemas as well as various consumer level and commercial level products. Driven by the demands for extended visual fidelity and artistic freedom, HDR technology is currently moving forward very rapidly. On the capturing side, there are the development of both professional HDR-camera systems such as the Arri Alexa XT and the Red Epic Dragon with an extended dynamic range of up to 14-16.5 f-stops, as well as research prototypes [Tocci et al. 2011; Kronander et al. 2013] exhibiting a dynamic range of up to 20-24 f-stops. On the production side, major studios are meeting this ongoing trend by developing fully HDR-enabled production pipelines, putting a completely new creative toolset in the hands of the artists. Also on the display side, HDR technology is in strong focus. Manufacturers, e.g. Sim2, have moved towards extending the dynamic range using high contrast local dimming techniques and Dolby Vision X-tended Dynamic Range PRO has recently been announced.

SUMMARY

According to one aspect, there is provided a method for tone-mapping an input image to generate a tone-mapped output image. The method includes determining a tone-curve based on a model of image contrast distortion between the input image and a tone-mapped image and tone-mapping the input image according to the determined tone-curve, and wherein determining the tone-curve comprises analytically calculating values of the tone-curve for reducing image contrast distortion within the model of image contrast distortion According to another aspect, there is provided a method for tone-mapping an input image to generate a tone-mapped output image. The method includes applying a spatial filter to the input image to generate a base layer and a detail layer, the filtering including for each of a plurality of pixels detecting the presence of an edge of the input image within a region surrounding the pixel and selectively applying a filtering kernel to the region according to the presence of the edge within the region.

According to yet another aspect, there is provided a method for tone-mapping an input image to generate a tone-mapped output image. The method includes extracting a base layer and a detail layer from filtering of the input image tone-mapping the base layer, modulating the detail layer based on a visibility threshold and a model of noise of the input image and combining the tone-mapped base layer and the modulated detail layer.

According to yet another aspect, there is provided a context-aware tone-mapping operator. The operator includes a noise model generator and a tone-mapping operator operable to receive one or more contextual parameters. The tone-mapping operator includes an edge stopping filtering submodule for extracting a base layer of an input image and a detail layer, a tone-curve generating submodule, and a combining submodule for combining the base layer and the detail layer. At least one of the edge stopping filtering submodule, the tone-curve generating submodule and the combining submodule is adjustable based on at least one of the one or more contextual parameters.

According to yet another aspect, there is provided a computer-implemented system for generating a tone-mapped output image from an input image. The system includes at least one data storage device and at least one processor coupled to the at least one storage device, the at least one processor being configured for determining a tone-curve based on a model of image contrast distortion between the input image and a tone-mapped image, and tone-mapping the input image according to the determined tone-curve, wherein determining the tone-curve comprises analytically calculating values of the tone-curve for reducing image contrast distortion within the model of image contrast distortion.

According to yet another aspect, there is provided a computer-implemented system for generating a tone-mapped output image from an input image. The system includes at least one data storage device and at least one processor coupled to the at least one storage device, the at least one processor being configured for applying a spatial filter to the input image to generate a base layer and a detail layer, the filtering comprising for each of a plurality of pixels detecting the presence of an edge of the input image within a region surrounding the pixel and selectively applying a filtering kernel to the region according to the presence of the edge within the region.

According to yet another aspect, there is provided a computer-implemented system for generating a tone-mapped output image from an input image. The system includes at least one data storage device and at least one processor coupled to the at least one storage device, the at least one processor being configured for extracting a base layer and a detail layer from filtering of the input image, tone-mapping the base layer, modulating the detail layer based on a visibility threshold and a model of noise of the input image and combining the tone-mapped base layer and the modulated detail layer.

BRIEF DESCRIPTION OF THE DRAWINGS

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants

DETAILED DESCRIPTION

Figure 1:
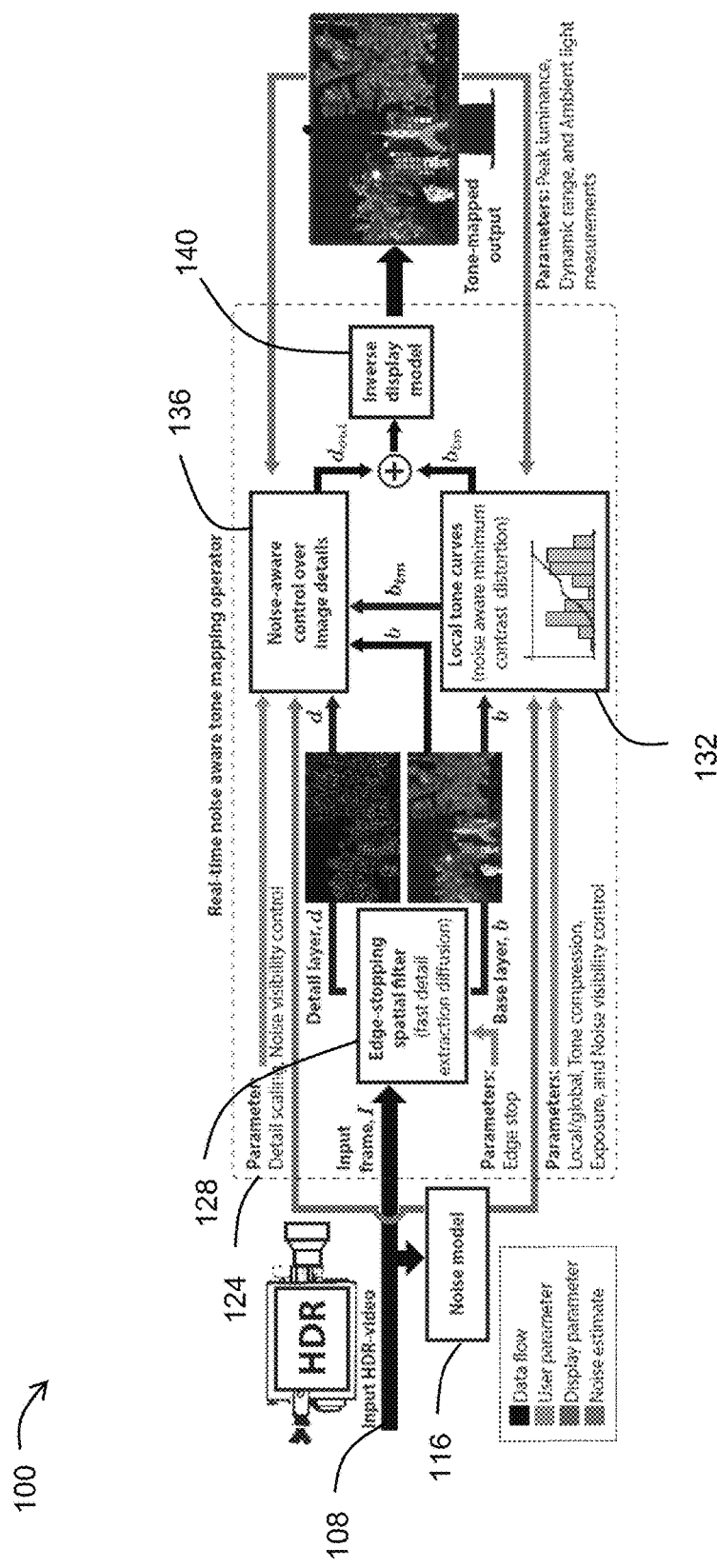
FIG. 1 illustrates a schematic diagram of the operational modules of a tone-mapping system according to one example embodiment.

Although significant efforts are being spent at each step in the HDR-video pipeline, from capture and processing to compression and display, one important challenge still requires substantial improvement: tone-mapping for HDR-video.

Tone-mapping herein refers to processing of values of an image, frame or frames of a video to map one set of colors to another set of colors. A typical application is the tone-mapping of HDR image or video to an image having a more limited dynamic range, although tone-mapping may also be applied to standard dynamic range image or video. Systems and methods that perform tone-mapping are generally referred to herein as a "tone-mapping operator" ("TMO").

Despite the need for robust video tone-mapping, the existing algorithms often fall short of expectations as they tend to reveal or amplify noise, cannot handle large contrast compression, introduce ringing, ghosting or temporal flicker [Eilertsen et al. 2013], do not adapt to the display and viewing conditions, or are slow to compute.

Related Work

Eilertsen et al. [2013] evaluated and analyzed 11 video tone-mapping operators. They categorized them into those that simulate the properties and limitations of the visual system—visual system simulators (VSS), those that attempt to preserve the original scene appearance—scene reproduction operators (SRP), and those that produce subjectively preferred images—best subjective quality operators (BSQ). Eilertsen et al. concluded that all tested operators were prone to introduce artifacts such as flickering, ghosting, amplified level of noise, or lack of details.

Temporal artifacts, such as flickering, are a significant problem for many video TMOs. For temporal stability, global operators often rely on filtering over time of the tone-curve [Mantiuk et al. 2008], or the TMO parameters [Pattanaik et al. 2000; Kiser et al. 2012]. While this allows for efficient implementation, the situation is more complicated for local TMOs, where the tone reproduction can change incoherently over time on a local level. To overcome such problems, and to reduce noise, many local TMOs employ spatio-temporal filters in the pixel domain, [Ledda et al. 2004; Bennett and McMillan 2005; Van Hateren 2006], or along motion paths, [Aydin et al. 2014]. However, these filters are usually expensive to compute and do not lend themselves well to real-time processing. Another problem is that that they are prone to introduce ghosting artifacts or may not work well where the optical flow fails.

Real-Time Noise-Aware Tone-Mapping

Broadly described, as exemplified in the accompanying drawings, therein is provided a novel system and method for tone-mapping an input image or video. The novel system and methods may also include one or more sub-elements effective for performing a step or portion of the tone-mapping. In some example embodiments of the system and method, the tone-mapping may be carried out in real-time and/or account for presence of noise (e.g. being "noise-aware"). The tone-curve generation portion of the system and method is based on a model of the image contrast distortion between the input image and the tone-mapped image. The novel system and method for tone-mapping described herein, examples embodiments described herein and variants thereof are generally referred herein as the "real-time contrast distortion-based TMO".

One or more real-time contrast distortion-based TMO systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, wearable device, tablet device, virtual reality devices, smart display devices (ex: Smart TVs), video game console, or portable video game devices.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein. In some embodiments, the systems may be embedded within an operating system running on the programmable computer. In other example embodiments, the system may be implemented in hardware, such as within a video card.

Furthermore, the systems, processes and methods of the described embodiments are capable of being distributed in a computer program product comprising a computer readable medium that bears computer-usable instructions for one or more processors. The medium may be provided in various forms including one or more diskettes, compact disks, tapes, chips, wireline transmissions, satellite transmissions, internet transmission or downloadings, magnetic and electronic storage media, digital and analog signals, and the like. The computer-usable instructions may also be in various forms including compiled and non-compiled code.

Referring now to FIG. 1, therein illustrated is a schematic diagram of the operational modules of a tone-mapping system 100 implementing the real-time contrast distortion-based TMO according to one example embodiment.

The tone-mapping system 100 receives as input an input image or video 108. The input video 108 may be formed of a plurality of sequential video frames. The input image or video 108 can be a standard dynamic-range image or a high dynamic-range image.

The tone-mapping system 100 may also receive as input one or more contextual parameters. Contextual parameters herein refer to parameters that define and/or characterize the environment in which the tone-mapped image or video (i.e. the input image or video after having tone-mapping applied to it) is to be displayed. The contextual parameters may also define and/or characterize the context in which the tone-mapped image or video will be viewed. Contextual parameters may include one or more of viewer characteristics (ex: viewer age, gender, sex, race, vision impairment).

Examples of contextual parameters include one or more of ambient light in the viewing environment, peak luminance of the output display device, dynamic range of the output display device, viewer preferences, speed and exposure. Other contextual parameters may also be included.

The tone-mapping system 100 may include a noise modeling module 116 which is operable for generating a model of the noise present in the input image or video 108. Particular example embodiments of noise modelling for use within the real-time contrast distortion-based TMO are described herein, however, it will be understood that other suitable noise models known in the art may be used herein. In other example embodiments, the noise model of the input image or video 108 may be generated externally of the tone-mapping system 100 and provided to the tone-mapping system 100 as a contextual parameter.

The tone-mapping system 100 further includes a tone-mapping module 124, which itself includes various submodules, as further described herein.

More particularly, the tone-mapping module 124 includes a filtering submodule 128, a tone-curve generating submodule 132, and a combining submodule 136.

The filtering submodule 128 is operable to apply filtering to the input image or frames of the input video 108 to extract a base layer b and a detail layer d of the input image or of each frame of the input video 108. Particular example embodiments of applying filtering to the input image or video 108 are described herein, however, it will be understood that various other suitable filtering methods known in the art for separating an image or frame into a base layer and a detail layer may be applied within the filtering submodule 128.

Various example embodiments of the filtering submodule 128 within the real-time contrast distortion-based TMO pertain to an edge-stopping spatial filter for extracting the base layer and the detail layer, which is described in more detail elsewhere herein. Advantageously, the edge stopping spatial filter according to various example embodiments can lead to a fast edge-stopping non-linear diffusion approximation for detail enhancement without ringing artifacts.

The tone-curve generating submodule 132 is operable to determine a tone-curve for tone-mapping image or frames of a video that is inputted to it. The tone-curve generating module 132 may receive as its input the base layer outputted by the filtering submodule 128. The curve generating module 132 may also receive as inputs one or more contextual parameters. The parameters may include user preferences for performing the generation of the tone-curve, as described elsewhere herein. In some example embodiments, the tone-curve generating submodule 132 further receives as inputs the noise model generated by the noise modelling module 116. One or more of the contextual parameters and the noise model may influence the generating of the tone-curve by the tone-curve generating module sub 132. The tone-curve generating submodule 132 is further operable to apply the generated tone-curve to the image or frames of the video inputted to it to generate a tone-mapped output. Where the base layer of the input image or video 108 is inputted to the tone-curved generating submodule 132, the submodule 132 outputs a tone-mapped base layer $b_{tm}$.

The combining submodule 136 is operable to combine or merge the detail layer outputted from the filtering submodule 128 with the tone-mapped base layer outputted by the tone-curve generating submodule 132. Various layer combining methods known in the art for combining a base layer and a detail layer may be applied within the combining submodule 136.

Various example embodiments of the combining submodule 136 of the real-time contrast distortion-based TMO provided herein pertain to a combining submodule 136 having noise-aware control over image details. For example, the combining submodule 136 may apply scaling of the detail layer based on presence of noise when combining the tone-mapped base layer and the detail layer. The scaled detail layer is denoted as $d_{out}$.

The tone-mapping module 124 may further include an inverse display modelling submodule 140. The inverse display modelling submodule 140 is operable to generate a model of the display device while accounting for environmental factors that affect the image perceived from the display device, such as ambient lighting. The inverse display modelling submodule 140 may further process the combined image outputted from the combining submodule 136 so as to output an output image that is adapted to the display device and environmental factors. The output image is ready for display on the display device.

Various example embodiments of the real-time contrast distortion-based TMO described herein are based on three requirements: noise awareness, temporal robustness, and display adaptivity.

Noise Modelling for Tone-Mapping

The visible noise in a video sequence can be greatly reduced using modern denoising algorithms [Maggioni et al. 2012; Aydin et al. 2014]. However, too strong denoising introduces blur and reduces image sharpness. Since the lack of sharpness is a less tolerable artifact than noise, the common video processing practice is to employ conservative noise reduction and then conceal the remaining noise in a manual color grading step.

According to example embodiments of the real-time contrast distortion-based TMO the grading step is automated by noise-aware tone-mapping. The input is either a (conservatively) denoised or a noisy video sequence. The result is a video, in which visibility of noise is reduced by considering both the noise properties and its visibility on a particular display device.

Figure 2:
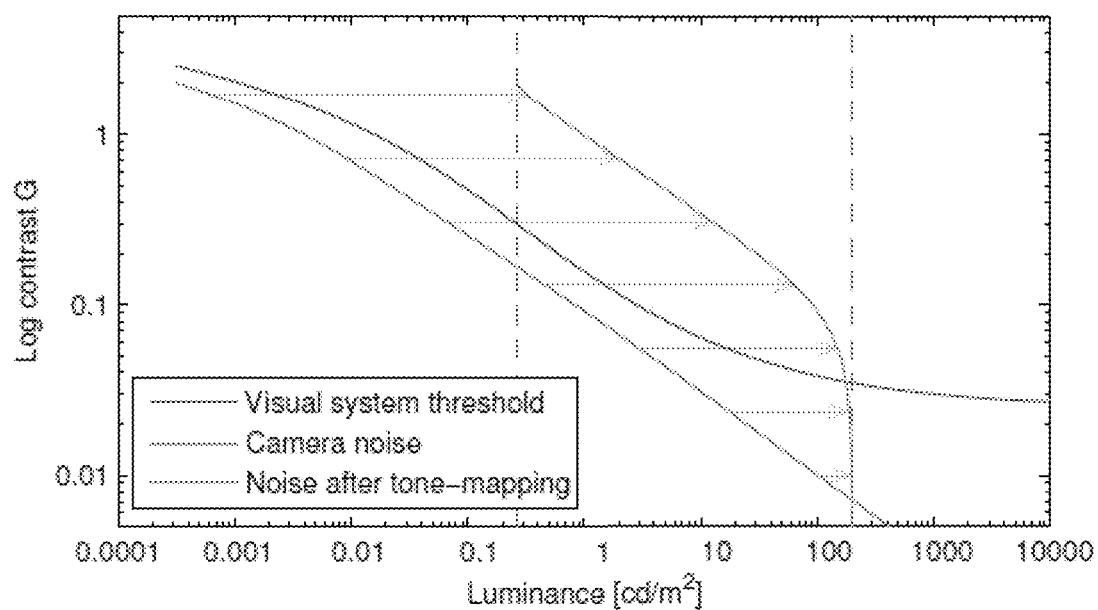
FIG. 2 is a graph illustrating the visibility threshold of human visual system, the noise of an image included in a typical image captured by a camera, and the level of noise after tone-mapping the image captured by the camera.

High-end cameras offer large apertures and large sensors, which often yield lower noise levels than those of the visibility threshold of the human visual system (the perceivable contrast of the visual system). FIG. 2 is a graph illustrating the visibility threshold of the human visual system (red line), the noise of an image included in a typical image captured by a camera (blue line), and the level of noise after tone-mapping the image captured by the camera (magenta). It will be appreciated that whereas the noise of the captured image is below the visibility threshold of the human visual system, the level of noise after tone-mapping is brought above the visibility threshold. This may be due to increase in absolute luminance levels and enhancement of fine contrast details.

Various example embodiments of real-time contrast distortion-based TMO described herein account for noise at least one of two steps: when determining the tone-curve, and when recombining the detail layer and the base layer. Accordingly, the tone-mapping system 100 may be used in combination with existing denoising methods, wherein the initial denoising with such methods removes high amplitude noise and the low amplitude noise is treated during the determining of the tone-curve and/or when recombining the detail layer and the base layer.

For modelling noise in the input image or video 108, the magnitude of the noise and the visibility threshold of the human visual system need to be taken into account. The variance of the noise in a digital camera can be modelled as the function of light intensity I [Foi et al. 2008]:

$$\sigma_n^2 = aI + b \tag{1}$$

where a and b are the parameters responsible for signal dependent (photon noise) and signal independent (read-out noise) components of the noise. The parameters can be estimated from the input image [Foi et al. 2008], be provided by the camera, or manually adjusted.

To account for the non-linear sensitivity of the visual system to light (Weber-Fechner law), the analysis is carried out in the logarithmic domain. The noise magnitude in the logarithmic domain can be approximated with:

$$n(I) = \log_{10}\left(\frac{I + \sigma n}{I}\right) \tag{2}$$

Referring back to FIG. 2, the noise magnitude is plotted as the red line. A conservative estimate of the visibility thresholds, shown as the blue line in FIG. 2, is given by the peaks of the contrast sensitivity function (CSF) for a particular display luminance level $L_d$. The CSF from [Mantiuk et al. 2011] may be used and converted the detection threshold ($C_t(L_d)=1/CSF(L_d)$) from Michelson contrast to logarithmic contrast to get the smallest detectable difference in log-luminance:

$$V(L_d) = 0.5\log_{10}\left(\frac{C_t(L_d) + 1}{1 - C_t(L_d)}\right) \tag{3}$$

Contextual parameters for the noise modelling module 116 may include the photon noise a and read-out noise b, which are user-defined. Other contextual parameters for the noise modelling module 116 may include parameters for capturing the input image or video 108, such as ISO (per pixel gain), sensor temperature, and integration time. Noise statistics, which can be estimated, may also be provided as a contextual parameter.

It will be understood that other methods known in the art for modeling noise of a video or image may be used.

Display Adaptivity

The main constraint of any tone-mapping operator is the available range of luminance that can be shown on a target display device. Such a range depends not only on the particular display technology, such as OLED or LCD, but also on the ambient light levels. A portion of ambient light is reflected from a display screen and thus reduces the available display contrast.

According to one example embodiment, a model of the available range of luminance is generated so as to take into current ambient light levels, which can be readily measured with a light sensor.

The available range of luminance can be modeled using the standard Gamma-Gain-Offset display model [Berns 1996] with the modification for ambient light [Mantiuk et al. 2008]:

$$L_d(L') = (L')^\gamma \cdot (L_{max} - L_{black}) + L_{black} - L_{refl} \tag{4}$$

where $L_d$ is displayed luminance or radiance (as measured coming from the display surface), L' is the pixel value (0-1), $\gamma$ is a display gamma (usually close to 2.2), $L_{max}$ is the peak display luminance (about 200 cd/m² for office displays). $L_{black}$ is the display black level, which is the luminance of the black pixel displayed in a perfectly dark room (usually from 0.1 to 0.8 cd/m² for LCD displays). $L_{refl}$ is the ambient light reflected from the display surface. For non-glossy screens this can be approximated as:

$$L_{refl} = \frac{k}{\pi} E_{amb} \tag{5}$$

where $E_{amb}$ is ambient illuminance given in lux units and k is the reflectivity for a display panel (0.5-1% for LCD displays).

The modeled available range of luminance may be applied within the inverse display modelling submodule 140 to produce the tone-mapped output image that is adapted to the target display device.

Minimum Contrast Distortion Tone-Curve

A tone-curve, which maps pixel values from input luminance to the luminance of the display, is the primary tool for reducing image contrast to the displayable range. The tone-curves used traditionally in photography have an S-shape, which preserves contrast in middle tones at the cost of higher distortions at low and high tones. If a fixed shape of a tone-curve was a necessity for analog film, digital processing allows variations of the tone-curve for each image, and every image region.

Expected contrast distortion/model of image contrast distortion: Arguably, the most relevant distortion due to tone-mapping is the change of image contrast. A model of image contrast distortion considers the difference between the contrast of an unmapped image, denoted by symbol G, and the contrast of the image after being tone-mapped by an applied tone-curve, denoted by symbol $\tilde{G}$. In the simplest case, image contrast G or $\tilde{G}$ could be a difference between two neighboring pixel, however other interpretations of the image contrast distortion are possible.

Various example embodiments of the tone-curve generating submodule 132 described herein determines the tone-curve based on the model of image contrast distortion between an unmapped image and tone-mapped image. For example, the tone-curve is determined based on desired properties of the model of image contrast distortion. The unmapped image may be the input image or video 108 inputted to the tone-mapping system 100. Alternatively, the unmapped image may be the base layer extracted from filtering of the input image or video 108.

More particularly, according to one example embodiment, the tone-curve is determined by calculating for values of the tone-curve that will reduce image contrast distortion within the model of image contrast distortion.

Even more particularly, according to one example embodiment, the tone-curve is determined by calculating for values of the tone-curve that will minimize image contrast distortion within the model of image contrast distortion.

According to one example embodiment of forming the model of the image contrast distortion, for each input log-luminance level l, a distribution of contrast values within the log-luminance level l can be expressed as p(G|l). Accordingly, the expected value of the image contrast distortion due to tone-mapping can be expressed as:

$$E[\|G-\tilde{G}\|_2^2] = \int p(l) \int (G-\tilde{G})^2 p(G|l) dG dl \quad (6)$$

This expected value may be used as a first model of the image contrast distortion between the unmapped image and the tone-mapped image.

The inner integral "sums" the squared distortions, $(G-\tilde{G})^2$, over all contrast values G for a given input log-luminance level l. The outer integral "sums" that result over all input log-luminance levels l. p(l) is the probability that a given contrast G is shown on a background luminance l. p(G|l) is the probability of finding in an image contrast G given the background luminance l. For example, if the contrast G is defined as a gradient, this probability will follow a heavy-tailed distribution. For natural images, the contrast distribution is, in a general case, independent of the local background luminance l, and therefore the assumption that p(G|l)=p(G) can be made.

Figure 3:
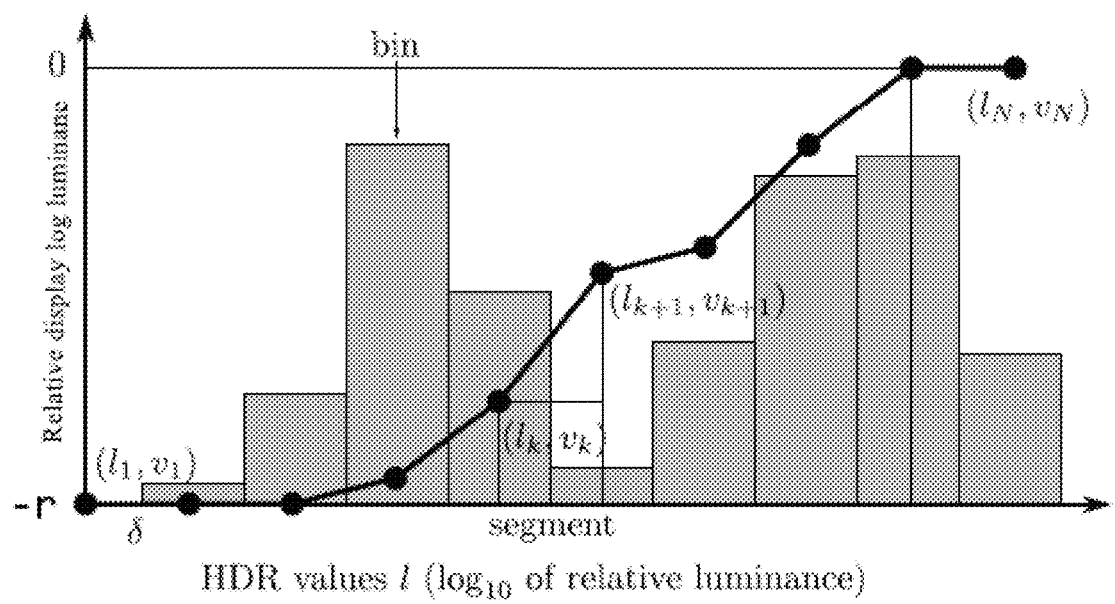
FIG. 3 is a graph showing a histogram (bins) of pixel values for a plurality of luminance level segments and a generated tone-curve formed of piece-wise linear slopes for each luminance level segment.

To keep the problem analytically tractable, the tone-curve to be generated is characterized as a piece-wise linear with the nodes $(l_k, v_k)$. The tone-curve to be generated from the model of image contrast distortion may be further submitted to the constraints of being a non-decreasing function. FIG. 3 illustrates a representative diagram of an example of piece-wise linear tone-curve that may be generated.

Accordingly, a plurality of luminance level segments is defined, each luminance level corresponding to a sub-range of the full range of luminance levels of the unmapped image. l is the logarithmic luminance in the unmapped image, and v is the logarithmic luminance of the outputted tone-mapped-image. Each luminance level segment k is defined between two nodes $(l_k, v_k)$ and $(l_{k+1}, v_{k+1})$ and has a constant width in log-luminance values equal to $\delta$ (ex: about 0.2 in one example embodiment). For simplicity, the maximum log-luminance value that can be shown on a display is fixed at 0 and the minimum varies with the effective display dynamic range r. r can be computed for the current ambient light level using the display model from Equation 4 as:

$$r = \log_{10}\left(\frac{L_d(1)}{L_d(0)}\right) \quad (7)$$

Having characterized the tone-curve as a plurality of piece-wise slopes, the contrast of the image for one luminance level segment after being tone-mapped can be represented as:

$$\tilde{G} = s_k G \quad (8)$$

wherein $s_k$ is the slope of a tone-curve in the segment k:

$$s_k = \frac{v_{k+1} - v_k}{\delta} \quad (9)$$

Therefore, the discrete approximation of the expected distortion can be expressed as:

$$E[\|G-\tilde{G}\|_2^2] \approx \varepsilon(s_1, \ldots s_k) = \Sigma_k p(l_k) \Sigma_G (G - s_k G)^2 p(G) = \Sigma_k p(l_k)(1-s_k)^2 \Sigma_G G^2 p(G) \quad (10)$$

The term $(1-s_k)$ is independent of the contrast G and thus can be moved outside the sum. The values $p(l_k)$ can be computed as a histogram of image log-luminance values with the centers of the bins at $l_k$ for k=1 ... N.

Reducing/Minimizing contrast distortion According to various example embodiments, the values of the tone-curve are calculated so as to reduce or minimize the expected contrast distortion due to the generated tone-curve from Equation 10:

$$\arg\min_{s_1 \ldots s_N} \varepsilon(s_1 \ldots s_n) \quad (11)$$

According to various example embodiments, the determining of values of the tone-curve is further subject to the condition that each piece-wise linear slope forming the tone-curve is non-decreasing: $s_k \geq 0$ for k=1 ... N Alternatively, or additionally, the determining of values of the tone-curve is further subject to the condition that the output image tone-mapped according to the piece-wise linear slope is within the available dynamic range of a display device for displaying the tone-mapped output image.

$$\sum_{k=1}^{N} s_k \cdot \delta \leq r, \text{ where } r = v_N - v_1 \quad (12)$$

The first constraint ensures that the tone-curve is non-decreasing, and the second that the maximum available dynamic range on the display is not exceeded.

Note that the sum over G in Equation 10 is independent of the tone-curve slope $s_k$. Therefore, when reducing/minimizing $\varepsilon(s_1, \ldots, s_k)$ as a function of a tone-curve given by $s_1, \ldots, s_k$, the contrast distribution p(G) has no impact on the minimum. The problem can thus be simplified to reducing/minimizing the functional:

$$\varepsilon'^{(sk)} = \Sigma_k p(l_k)(1-s_k)^2 \quad (13)$$

which may be further subjected to the conditions given Equation 12. Accordingly, the piece-wise linear slope representing a portion of the tone-curve for a luminance level segment k is determined for reducing the sum over all luminance level segments (k=1 ... N) of at least one of, or the product of:

i) a probability of any region of the unmapped image having a luminance level falling within a given (k-th) luminance level segment; and ii) a function of the piece-wise linear slope for the given (k-th) luminance level segment.

The function of the piece-wise linear slope for the given (k-th) luminance level segment may be the term $(1-s_k)$.

Referring back to Equation 10, the linear slope for each luminance level segment may be determined based on minimizing $$\varepsilon'(s_k) = \sum_{k}^{N} p(l_k)(1-s_k)^2,$$

wherein $p(l_k)$ is the probability of any region of the unmapped image having a luminance level falling with the given (k-th) luminance level segment, $s_k$ is the piece-wise linear slope of the given (k-th) luminance level and $(1-s_k)^2$ is the differential value of the piece-wise linear slope for the given (k-th) luminance level segment.

Continuing with Equation 13, minimizing this equation can be solved analytically by calculating the first order Karush-Kuhn-Tucker (KKT) optimality conditions of the corresponding Lagrangian. This gives the solution (refer to Appendix A for the derivation):

$$s_k = 1 + \frac{\frac{r}{\delta} - N}{p(l_k)\sum_{i=1\ldots N}\frac{1}{p(l_i)}} \quad (14)$$

The above solution may result in negative slopes and thus violate the first constraint. To avoid this the slopes for those luminance level segments for which the probability $p(l_k)$ is less than a certain threshold are set to 0. From Equation 14, it will be appreciated that $s_k \geq 0$ when:

$$p(l_k) \geq \frac{N - \frac{r}{\delta}}{\sum_{i=1\ldots N}\frac{1}{p(l_i)}} \text{ for } k = 1 \ldots N \quad (15)$$

Note that the above inequality cannot be solved directly because it contains $p(l_k)$ both on the left side of the equation and in the sum on the right side. Also, the equation cannot be solved if $p(l_i)$ is equal to 0 for any i. Therefore, to find the luminance level segments with non-zero slopes, the luminance level segments are split into those whose probability $p(l_k)$ is above a certain threshold $p_t$:

$$\Omega_t = \{k=1 \ldots N : p(l_k) > p_t\} \quad (16)$$

and assign slope 0 to the remaining segments, and update the threshold probability iteratively:

$$p_{t+1} = \frac{|\Omega_t| - \frac{r}{\delta}}{\sum_{k \in \Omega_t} \frac{1}{p(i)}} \quad (17)$$

for t=1, 2 ..., where $|\Omega_t|$ is the cardinality of the set $\Omega_t$. When initialized with a small starting probability value, here $p_0=0.0001$, the recursive formula quickly converges and allows for separating luminance level segments into those with zero and positive slopes, and enforce the first constraint of the optimization problem.

According to various example embodiments, about 20 to about 30 luminance level segments are defined. Within this range of number of segments, the tone-curve can be found with minimal computational overhead given only an image histogram. The complexity is reduced significantly compared to more complex metrics, e.g. the one used in [Mantiuk et al. 2008], where a multi-scale pyramid needs to be built and a series of quadratic programming problems need to be solved. In contrast to [Mantiuk et al. 2008], image contrast distortion is measured using a simple $L_2$ norm instead of a visual model. However, given the limited flexibility of a tone-curve, the benefits of a complex visual model are marginal.

The tone-curve generating submodule 132 may receive a plurality of contextual parameters which affect the generation of the tone-curve and the application of the tone-curve for tone mapping. Such contextual parameters may include tone compression, exposure, peak luminance of the display device, dynamic range of the display device, and ambient light. User defined parameters may include the number, size and direction of local regions, the ratio of the effect of the local and global tone-curves when combined, and tone priority (ex: controls which tones to give higher priority).

Noise—and Content-Aware Tone-Curve

In the previous sections, it was assumed that the probability $p(l_k)$ corresponds to the frequency of a given intensity value in an image (taken from an image histogram). It was observed that, however, it is not an ideal estimator of the importance of a particular intensity level in an image. For example, if a substantial portion of an image contains a uniform surface, e.g. a white wall, the corresponding $p(l_k)$ value is going to be high due to the peak produced in the histogram. Since flat surfaces are usually not the most salient part in an image, there is little purpose in assigning them high importance and allocating steep tone-curves for them. Similarly, night scenes often contain large regions with substantial amount of noise and only little details. Allocating dynamic range for such regions will lead to amplification of the noise and produce unattractive results.

According to various example embodiments, the tone-curve is generated further taking into account an image saliency of the unmapped image. For each piece-wise linear slope of the portion of the tone-curve, image saliency of the luminance level segment corresponding to the piece-wise linear slope is determined. For example, the linear slope of the portion of the tone-curve may be determined to reduce the sum over all luminance level segments of the product of at least two of the probability of any region of the unmapped image having a luminance level falling within a given (k-th) luminance level segment, an image saliency of the (k-th) luminance level segment; and a function of the piece-wise linear slope for the given (k-th) luminance level segment.

According to one example embodiment, an image saliency is determined taking into account both image content and noise levels, which is further used to determine the probability $p(l_k)$ for the k-th luminance level segment. When determining image saliency, higher importance is assigned to regions with contrast variations above the noise level. First, an estimate of local contrast as a standard deviation is computed within a Gaussian window:

$$c(x,y) = \sqrt{(g_\sigma * l)^2(x,y) - (g_\sigma * l)^2(x,y)} \quad (18)$$

where * is the convolution operator and $g_\sigma$ is a Gaussian kernel with the standard deviation σ (ex: σ=3 in one example embodiment). The image saliency may further be a function of an amount of regions of the input image having an image contrast for the given (k-th) luminance level segment greater than a noise level of a noise model of the input image. For example, the probabilities as a histogram that is weighted by the contrast values which are greater than the noise level n at the pixel position. This can be expressed as:

$$p(l_k) = \frac{\sum_{(x,y) \in B_k} c(x,y)}{\sum_{(x,y) \in S} c(x,y)} \quad (19)$$

where $$S = \{(x,y) : c(x,y) > n(x,y)\} \quad (20)$$

$$B_k = \{(x,y) \in S : l_k - 0.5\delta \le l(x,y) < l_k + 0.5\delta\} \quad (21)$$

S is the set of all pixels whose local contrast is higher than the level of noise, and $B_k$ is the subset of S which contains the pixels within a particular histogram bin k. In practice, this approach shifts the dark regions affected by sensor read-out noise towards dark tones, making them less visible. It also avoids overstretched contrast in large uniform areas.

Tone priority The noise-aware image contrast measure proposed above can be considered as a simple measure of image saliency. If this simple saliency measure is not sufficient, more advanced measures may be used, where, for example, higher saliency is assigned to detected faces or skin tones. In some examples, it may be useful to include a tone-priority parameter, which balances the importance of high or low-tones by weighting $p(l_k)$ values depending on their input log-luminance. This gives an additional creative control parameter over the produced images.

Temporal Consistency

According to one example embodiment of the real-time contrast distortion-based TMO, temporal changes in the input video (or the unmapped video) may be taken into account to reduce flickering of the tone-mapped output image.

The image statistics $p(l_k)$ can change rapidly between consecutive video frames. This may result in disturbing flickering artifacts, see [Eilertsen et al. 2013]. Flickering artifacts may be introduced either in the base-detail layer decomposition, or if the tone-curve changes rapidly between frames.

According to one example embodiment, the tone-curve generated for each of a sequence of frames of the input video being tone-mapped is filtered in time to reduce or remove flickering artifacts.

The filtering of the tone-curve(s) acts on the visually most relevant data, which are the node positions $v_k$. It was observed through discussions with technical artists that the choice of filter depends on both the intent/artistic goals of the tone-mapping as well as the input video. A 3-tap low-pass IIR filter with a cutoff frequency of 0.5 Hz may be used. This frequency was selected to minimize visible flicker, see [Mantiuk et al. 2008]. IIR filters are simple to implement and results in a smaller filter size than FIR filters. Alternatively a temporal edge-stop filter may be used, which preserves sharp temporal transitions. However, experimenting with these (and other) filters, visual improvements were not observed, except in situations with extreme temporal variations. The choice of temporal filter and its effect on the pixel response is discussed and illustrated in detail in the supplementary material. The implementation is flexible in that it allows the tone-curve filter to be interchanged.

It should be noted that the temporal filtering may not preserve object brightness consistency [Boitard et al. 2012] and some objects may gradually change their brightness over time. Preserving brightness, however, would strongly reduce achievable image contrast and requires preprocessing the entire video sequence. Approaches described herein trade off object brightness consistency for better contrast reproduction and real-time on-line processing. It is possible to enforce stronger brightness consistency by using a lower cutoff frequency. The tone-curve generating submodule and methods described herein reduce contrast distortions per-frame while the temporal filter minimizes flickering distortions in the temporal domain. The temporal filter may pull the solution per-frame from the point of optimum and result in a slightly worse solution for that frame, but better solution for the entire video clip. Even though it is possible to find a family of optimal tone-curves for the entire video sequence, this would make the method unsuitable for real-time processing and would bring little improvement in quality.

Local Tone-Curves

Figure 4:
FIG. 4 shows an outputted tone-mapped images using a global tone-curve and an outputted tone-mapped image using local tone-curves.

The human visual system is able to perceive a large range of luminance levels due to its ability to adapt to local scene regions. The exact mechanism and the spatial extent of such spatial local adaptation are still not well understood, but there is ample evidence of pooling information both locally and globally across the visual field, for example when making brightness judgments [Allred et al. 2012]. According to one example embodiment, different tone-curves are computed and applied to different image regions of an image of frame. As shown in [Reinhard and Devlin 2005], locally adaptive tone-curves can significantly boost visibility of image details without introducing any noticeable artifacts. FIG. 4 shows a frame generated using global and local tone-curves.

Accordingly, an input image to be tone-mapped is subdivided into a plurality of local regions, and a tone-curve is determined for each of the local regions. In one example embodiment, the input image is subdivided into a plurality of vertical local regions. Alternatively, the input image is subdivided into a plurality of horizontal local regions.

In one example embodiment, the input image is subdivided of 5 visual degrees each (about 230 pixels for a 15" full HD display seen from 45 cm), which is approximately the diameter of the fovea in the retina. Then, importance values $p_t(l_k)$ are computed separately for each tile t. Such local luminance-importance statistics cannot be directly used for computing local tone-curves because it contains 0-values for the luminance levels that are missing in a particular tile but exist in an image. This results in highly locally adapted tone-curves, which are so different across an image that they cause visible discontinuities of tones. To compensate per-tile $p_t(l_k)$ values are blended with the global probability $p(l_k)$ for the entire image in the ratio 10% global and 90% local, and then compute local tone-curves. To apply local tone-curves to an image, the tone-curve values are interpolated between the neighboring tiles, so that a 3D look-up is performed instead of a typical 1-D look-up in case of a single global tone-curve. Each local tone-curve needs to be filtered independently over time using the IIR filter explained in the previous section. Note that the computational overhead of local tone-curves is minimal since the most expensive operation, which is computing $p_t(l_k)$ for each tile, takes in total almost the same time as computing $p(l_k)$-values for the entire image.

Comparison with Other Tone-Curve Generating Methods

Using a histogram to compute a tone-curve may appear similar to histogram equalization, which is a popular technique for image enhancement. However, the objectives and the results of the two methods are very different.

As shown in [Mai et al. 2011], histogram equalization is equivalent to allocating tone-curve slopes according to the formula:

$$s_k = \frac{rp(l_k)}{\delta \sum_{i=1}^{N} p(l_i)} \quad (22)$$

Figure 5:
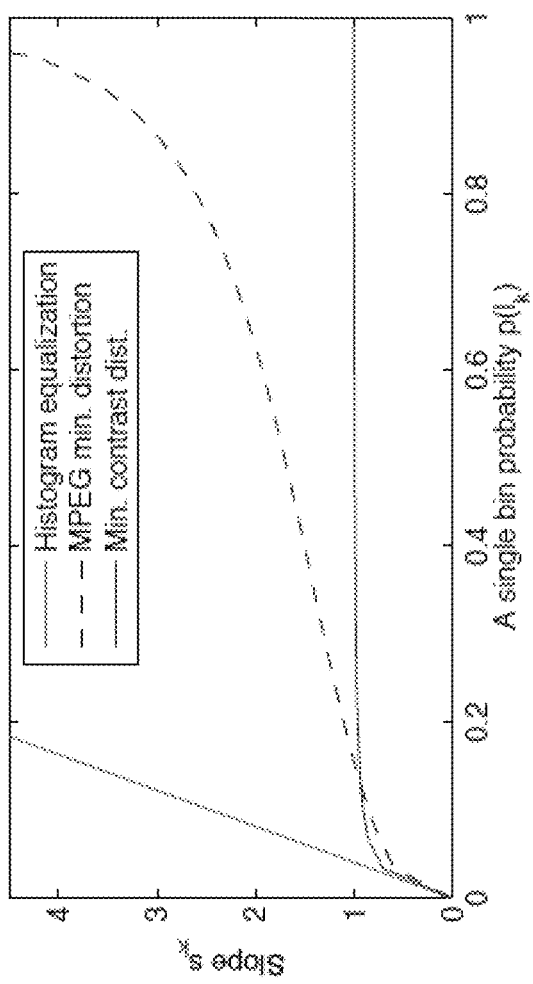
FIG. 5 is a graph showing the slope allocation for a tone-curve generated based on histogram equalization, slope allocation based on MPEG minimum distortion and slope allocation based on real-time contrast distortion-based TMO described herein.
Figure 6:
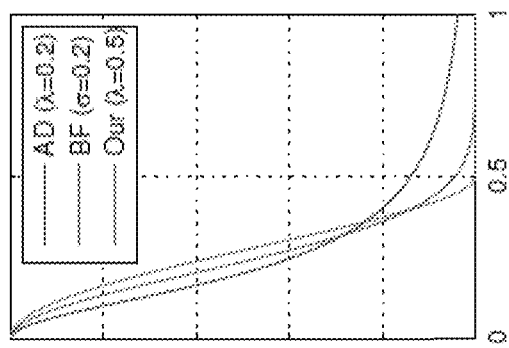
FIG. 6 is a graph showing edge-stop functions described in FIG. 1 herein.

FIG. 5 illustrates the slope allocation between histogram equalization (red line) and slope allocation from tone-curve generation of real-time contrast distortion-based TMO described herein. The figure shows how the slope of a tone-curve is allocated depending on the probability of the corresponding luminance level (or bin), $p(l_k)$. While the slope tone-curve generation described herein based on image contrast distortion never exceeds the value of one (which corresponds to non-distorted contrast), histogram equalization attempts to assign the highest contrast possible to the segments of high probability $p(l_k)$. In Appendix B it is shown that the tone-curve slopes are exponentially related to the probability values $p(l_k)$, assigning very high slopes to the bins with high probabilities. This is one of the reasons why histogram equalization tends to over-enhance regions of uniform pixel values, which cause the probability values $p(l_k)$ to be high. Larson et al. [Ward Larson et al. 1997] address this issue by clamping the maximum probabilities $p(l_k)$ to the value determined from the threshold-versus-intensity function. This is, however, an ad-hoc approach, which does not ensure that contrast distortion is minimal.

Tone-curve generation described herein based on image contrast distortion is also similar to the optimum tone-curve derived for the purpose of backward-compatible HDR image and video encoding [Mai et al. 2011], which is shown as a dashed line in FIG. 5. This approach is less aggressive with contrast enhancement than histogram equalization, but will still boost contrast instead of preserving it because this results in lower coding errors after inverse-tone-mapping of the LDR layer.

Filter Design for Tone-Mapping

Base and detail layer decomposition (b and d in FIG. 1) is a commonly used technique for preserving local contrast in tone-mapping. The base layer, b, obtained using an edge-preserving low-pass filter, is compressed using a tone-curve, and the detail layer, d, is retained, or even enhanced.

The most important aspect in the decomposition is the choice of filtering method. Previous TMOs, see e.g. [Eilertsen et al. 2013] for an overview, have mostly relied on classical image filters designed for e.g. noise reduction. A common choice for base—detail layer decomposition has been the bilateral filter [Aurich and Weule 1995; Tomasi and Manduchi 1998], mainly due to its simplicity. A problem, however, is that there are fundamental differences between the intent of the classical image filters and the object of tone-curve generation, detail extraction. First, image details are found at larger spatial scales than noise, i.e. detail extraction filters require large supports in the spatial and intensity domains without introducing visible artifacts. Secondly, the final result here is the base, b, and detail layer, d, and not a filtered image. The detail layer is highly sensitive to filtering artifacts, where the behavior along edges is extremely critical. Even small artifacts (which may be invisible in ordinary image filtering) may become visually disturbing after tone-mapping, especially for video.

In Appendix C it is shown why the bilateral filter fails to correctly reconstruct the underlying signal (base layer) of a smooth edge, and which implications this have on the detail layer separation. These observations are used herein in the filter construction, where the bilateral filter is related to anisotropic diffusion [Perona and Malik 1990], and from there an efficient filter that is specifically designed for the purpose of base—detail layer decomposition is derived.

Filter construction: A diffusion operation for image filtering is carried out as a conduction process, in which the pixel values, I(p), are propagated over time, t, to their neighbors according to the diffusion PDE:

$$\frac{\partial I(p)}{\partial t} = \text{div}(w_r(p, t) \cdot \nabla I(p)) \quad (23)$$

If $\omega_r(p,t)=c$ is constant, this reduces to the isotropic heat diffusion equation. In non-linear diffusion edges are preserved by constraining the diffusion to uniform image regions using the image gradient magnitudes as a stopping criterion, $\omega_r(\|\nabla I(p)\|)$. In image filtering, this is approximated by discretizing the time domain, and by iteratively calculating the inflow, V, at each pixel, p, from its closest neighbors in an adaptive smoothing procedure. For iteration k+1 this can be described as:

$$I^{k+1}(p)=I^k(p)+V(I^k,p) \quad (24)$$

To preserve high contrast structures, the weights are based on distances in both the spatial and intensity domain. In contrast to this, the bilateral filter runs in a single iteration using a larger neighborhood for the weighted average. As described in [Durand and Dorsey 2002], 0-order anistropic diffusion can be extended with a larger spatial support to allow for a connection to the bilateral filter:

$$V(I,p)=\alpha \Sigma_{q \in \Omega_p} w_s(\|q-p\|) w_r(I(q)-I(p))(I(q)-I(p)) \quad (25)$$

Here, α is the diffusion rate, which for the bilateral filter can be interpreted as the normalization $\alpha=1/\Sigma w_s w_r$. Using different neighborhoods $\Omega$, spatial weights $w_s$ and intensity weights $w_r$, a range of different filters can be described. For anisotropic diffusion and the bilateral filter these functions are shown in Table 1. In order to maintain low complexity and avoid artifacts, an isotropic approach is used:

$$V(I,p) = \alpha w_r(\|\nabla I(p)\|) \Sigma_{q \in \Omega_p} w_s(\|q-p\|)(I(q)-I(p)) \quad (26)$$

where $\nabla I(p)$ is the image gradient at a pixel position p. This filter can be evaluated very fast by iteratively applying linear filters, which are weighted using the per-pixel edge-stop function, $w_r$. Since the isotropic kernel has uniformly distributed samples around p, it yields an unbiased result without over-sharpening problems. To preserve edges, the kernel size adapts to image structure, which means that a smaller number of samples are used along steep (high gradient) edges. However, since the aim of the spatial filtering is base—detail separation, it is safer to let details be less pronounced along edges than risking artifacts (see FIG. 9). Furthermore, since the edge itself is perceptually dominant a possible loss of texture detail is significantly less disturbing compared to an incorrect and/or temporally incoherent edge.

The filter behavior along edges is determined by the edge-stop function and the way the gradient estimates are computed. It was observed that isotropic kernels inherently require a conservative stopping function in order to propagate the flow close to, but not across edges. To accomplish this, Tukey's biweight [Blacket al. 1998], see Table 1 is used, which conservatively stops the diffusion at gradient magnitudes equal to or greater than $\lambda$. Also, a robust gradient formulation is used, which is expressed as a linear ramp over the local neighborhood $\Omega_p$ around pixel p=(x, y), according to:

$$\|\nabla I(x, y)\| = \sqrt{\nabla_x^2 I(x, y) + \nabla_y^2 I(x, y)} \quad (27)$$

$$\nabla_x I(x, y) = \sum_{\delta=-\lceil 3\sigma_k \rceil}^{\lceil 3\sigma_k \rceil} \delta I(x+\delta, y)$$

$$\nabla_y I(x, y) = \sum_{\delta=-\lceil 3\sigma_k \rceil}^{\lceil 3\sigma_k \rceil} \delta I(x, y+\delta)$$

where $\lceil \cdot \rceil$ denotes the ceiling operation. With this formulation the diffusion stops faster at edges compared to using e.g. difference of Gaussians (DoG). When Equation 26 is combined with Equation 27, the flow is completely stopped when a pixel is closer to a high contrast edge than the radius of the neighborhood $\Omega$. To enable filtering close to edges while ensuring fast diffusion, the size of $\Omega$, starting with a very small kernel and increasing its radius as the diffusion progresses. The size of $\Omega$ varies so that the net size of the filter after N iterations is N$\sigma$, where $\sigma$ is the starting size of the kernel. That is $$\sqrt{\sum_{k=1}^{N} \sigma_k^2} = N\sigma.$$

Finally, the diffusion using the distance to the original image is constrained to prevent possible extreme values in the reconstruction (see line 7 in Algorithm 1).

The final formulation of the filter design is given in Table 1 and outlined in Algorithm 1. A convergence analysis including motivations for setting the number of iterations N can be found in the supplementary material. According to one example embodiment, N=12 iterations are used.

It will be appreciated that the filtering method includes applying a special filter to the input image to generate a base layer and a detail layer. For each of a plurality of pixels, it is determined whether there is the presence of an edge of the input image within a region surrounding the pixel. Based on the presence of an edge within the region surrounding the pixel, a filtering kernel is selectively applied to that pixel. The spatial filter may be applied iteratively with the size of the filtering kernel being increased in each iteration. For a given pixel, the flow of filtering across iterations is stopped upon determining a gradient within the region surround the given pixel being greater than a predetermined edge threshold, which represents the presence of an edge within the region.

TABLE 1

| | Anisotropic diffusion (AD) |
|---|---|
| Distance | $w_s(x) = \begin{cases} 1 & (x = 0) \\ \frac{1}{x}, & (x \neq 0) \end{cases}$ |
| Edge Stop | $w_r(x) = 1 / \left(1 + \left(\frac{x}{\lambda}\right)^2\right)$ |
| Neighborhood Iterations | $\Omega_p = \{q \in \mathbb{Z} \mid \|q - p\| \leq \sqrt{2}\}$<br>$k = 1, \ldots, N$ |
| | Bilateral filter (BF) |
| Distance | $w_s(x) = \exp\left(-\frac{x^2}{2\sigma_s^2}\right)$ |
| Edge Stop | $w_r(x) = \exp\left(-\frac{x^2}{2\sigma_r^2}\right)$ |
| Neighborhood Iterations | $\Omega_p = \{q \in \mathbb{Z} \mid \|q - p\| \leq 3\sigma_s\}$<br>$k = 1$ |
| | Our approach |
| Distance | $w_s(x) = \exp\left(-\frac{x^2}{2\sigma_k^2}\right)$ |
| Edge Stop | $w_r(x) = \begin{cases} \left(1 - \left(\frac{x}{\lambda}\right)^2\right)^2, & (x \leq \lambda) \\ 0, & (x > \lambda) \end{cases}$ |
| Neighborhood Iterations | $\Omega_p = \{q \in \mathbb{Z} \mid \|q - p\| \leq 3\sigma_k\}$<br>$k = 1, \ldots, N$ |

| Algorithm 1 Outline of our fast detail extraction diffusion | |
|---|---|
| 1: input l, N, σ, λ | ▷Input l is in the log domain |
| 2: $l_f \leftarrow l$ | |
| 3: for k = 1, 2 . . . , N − 1, N do | |
| 4: $\sigma_k \leftarrow \sigma_g(k)$ s.t. $\sqrt{\Sigma_{i=1}^{k} \sigma_g^2(i)} = k\sigma$ | ▷Iterative filtering of a signal corresponds to filtering original signal with linearly increasing filter size. |
| 5: $\ln \leftarrow g_{\sigma_k} * l_f$ | |
| 6: $\|\nabla l_f\| \leftarrow$ Equation 27 | ▷Gradient magnitude |
| 7: $\|\nabla l_f\| \leftarrow \max(\|\nabla l_f\|, k\|l_n - l\|)$ | ▷Constrain gradient magnitude |
| 8: $w_r \leftarrow$ Table 1 | ▷Edge-stop function |
| 9: $l_f \leftarrow (1 - w_r) \cdot l_f + w_r \cdot l_n$ | ▷Iterative filtering refinement |
| 10: end for | |
| 11: return $l_f$ | |

As shown in Algorithm 1, according to various example embodiments, the input image or video 108 is transformed to the log domain (l=log (I)) prior to applying the filtering.

One or more user-defined parameters may be applied to the filtering submodule 128. These include one or more of filter size in the spatial domain (ex: σ), the number of iterations, and the threshold applied for the edge-stop function.

Comparison with Other Methods

Figure 7:
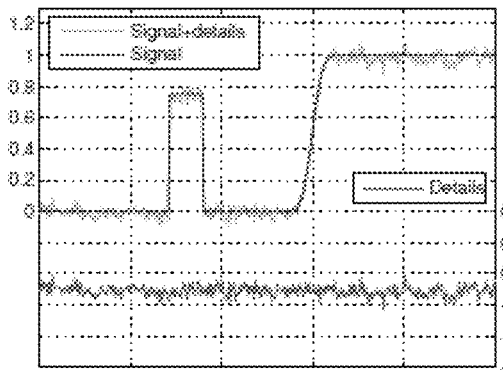
FIG. 7 illustrates the response of different filters showing detail (noise) added to an original signal)
Figure 7:
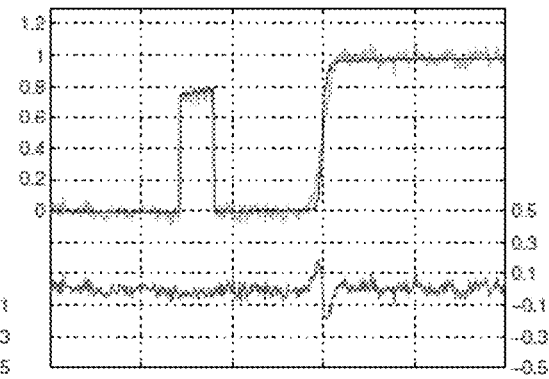
Figure 7:
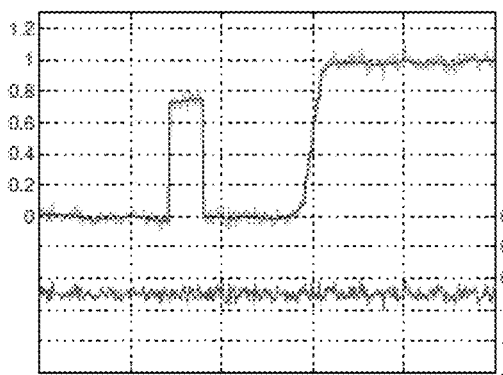
Figure 7:
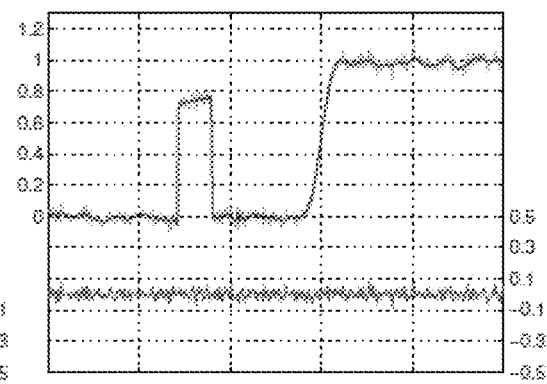
Figure 7:
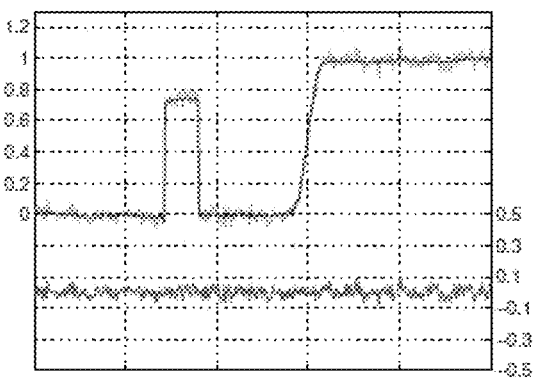
Figure 7:
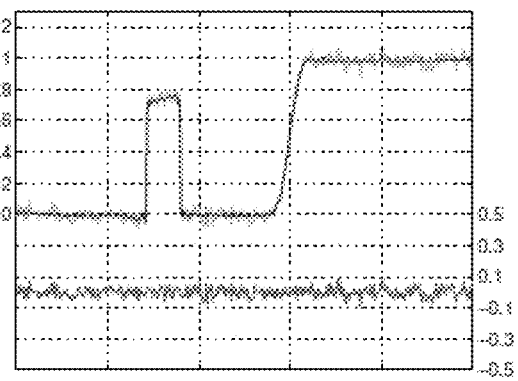

FIG. 7 illustrates a one-dimensional signal in order to show the behaviors of different low-pass edge-stop filters and relate them to the fast detail extraction diffusion filter described herein according to various example embodiments. The input, see 7a, is a signal (blue) with details (green) added using a noise function. The filters are then used to reconstruct the signal without details. The MSE of the reconstructions are scaled by $10^4$, and provided for numerical comparison. The detail extraction diffusion described herein is compared to the classical bilateral filter (BF) and anisotropic diffusion (AD), tri-lateral filter (TF) [Choudhury and Tumblin 2003], and the current state-of-the-art filter fast local laplacian (FLL) [Aubry et al. 2014]. At the step edge on the left, where a piece-wise constant assumption holds, the 0-order filters show no problems. However, for the smooth edge on the right, BF shows banding and AD is prone to staircase artifacts. TF, FLL, and detail extraction diffusion filter described herein do not generate visible artifacts. TF and FLL, however, are both computationally expensive compared to detail extraction diffusion filter described herein. Another important difference is that detail extraction diffusion filter described herein is specifically designed for detail extraction for tone-mapping without introducing artifacts, while e.g. FLL show a tendency to create false edges at smooth intensity transitions.

Figure 8:
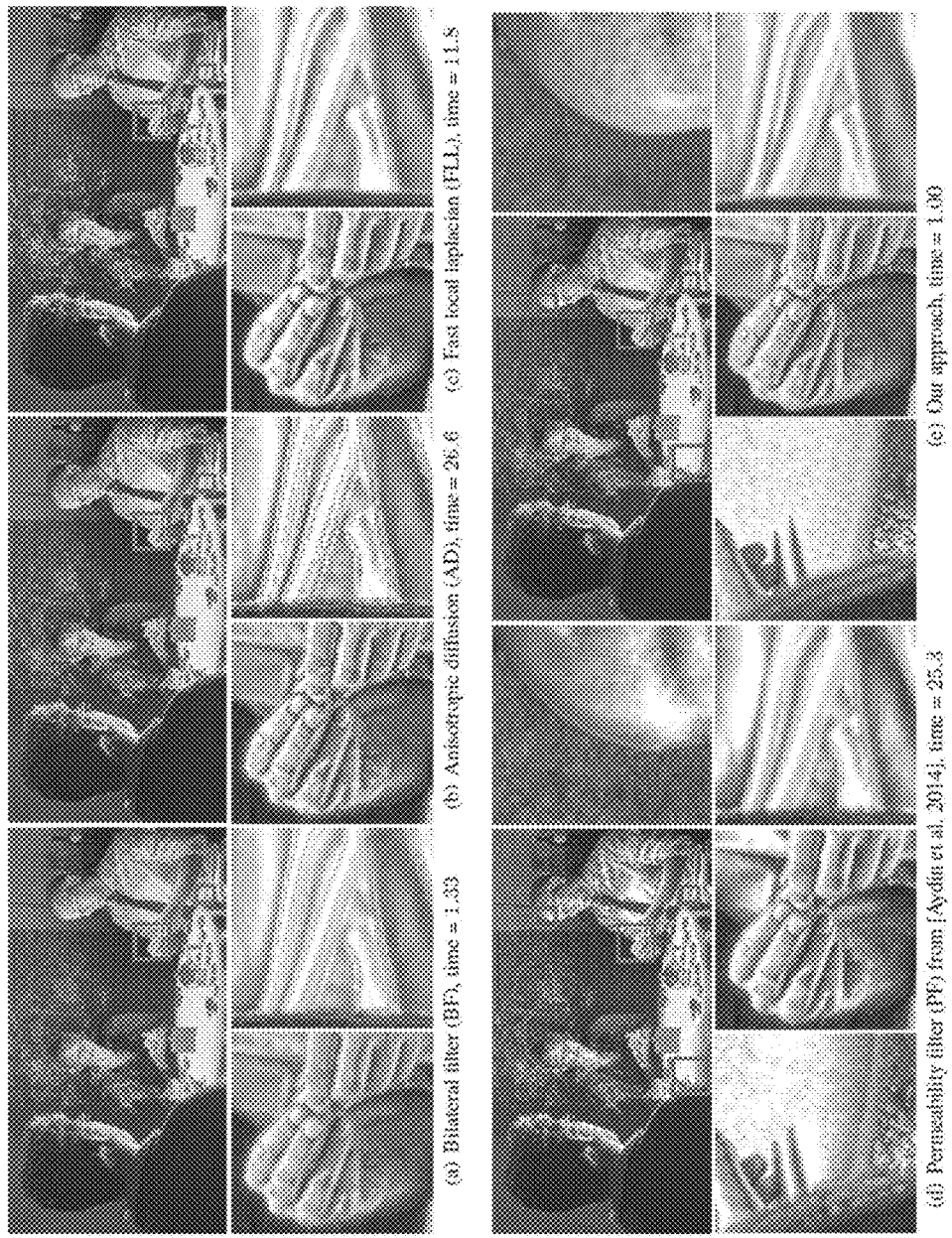
FIG. 8 illustrates results of different edge-preserving filters being applied using the same tone-curve for tone-mapping.

FIG. 8 illustrates application of different edge-preserving filters for detail extraction while using the same tone-curve. The details are scaled by a factor of 5 to highlight filtering differences and artifacts, and enlarged versions show the areas indicated by the square of the images. Timings of Matlab implementations of the filters are also given, compared to the filtering of the real-time contrast distortion-based TMO described herein.

The tone-curve described herein in the context of the real-time contrast distortion-based TMO has been applied to the filtered images, followed by adding back extracted details, scaled for easier comparison in print. The fast local Laplacian filter (FLL) is displayed to demonstrate the difference between detail extraction diffusion filter described herein and current state-of-the-art filtering. In addition, the permeability filter (PF) introduced by [Aydin et al. 2014] for detail extraction, is demonstrated in the figure. This filter works well for minor to moderate detail enhancements, but artifacts are clearly visible for stronger manipulations. From the examples it becomes evident that it is better to limit the filtering around edges instead of risking the artifacts shown by classical 0-order filters (BF and AD). Compared to FLL and PF, detail extraction diffusion filter described herein may lose a small amount of detail along some of the edges. However, in the case of tone-mapping, this is the preferred behavior as it ensures robust detail enhancement, while the other filters may introduce artificial edges (ringing artifacts) and temporal inconsistencies at smooth image transitions (see e.g. the edges on the shirt and the fingers in FIG. 8).

To give an indication on the performance of the filters, processing times are also shown in FIG. 8. These are relative to detail extraction diffusion filter described herein, and all report timings for Matlab implementations (the bilateral grid acceleration scheme is used for the BF [Chen et al. 2007]). This serves as a simple indicator of performance of non-parallelized code, in order to reflect the complexity of evaluation. It should be noted, however, that the different methods have different potential for parallelization, where e.g. detail extraction diffusion filter described herein is specifically designed for this purpose, and shows a performance increase of about 2 orders of magnitude on the GPU.

Noise-Aware Local Contrast Control

Once the base layer is tone-mapped with local tone-curves, it can be recombined with the detail layer within the combining submodule 136. If the detail layer is left unchanged, the tone-mapping will preserve local contrast. If the detail layer values are amplified or enhanced, the image details are boosted, which can produce attractive looks when combined with a high quality edge-stopping spatial filter. Enhancing image details, however, carries the risk of amplifying noise. The noise-aware tone-curve (Section 4.1) can conceal some noise in darker tones, especially sensor-read-out noise, but it is not effective in hiding noise in brighter image parts.

According to one example embodiment, the detail layer is modulated based on a visibility threshold of the tone-mapped base layer and a model of noise of the input image or video 108.

According to one example embodiment, the modulation may be expressed as:

$$d_{out}(x, y) = e \min\left(1, \frac{V(b_{tm}(x, y))}{n(b(x, y))}\right) \cdot d(x, y) \qquad (28)$$

where $V(b_{tm}(x,y))$ is the visibility threshold from Equation 3 and $n(b(x,y))$ is the noise level in the log-luminance domain (Equation 2). Note that the visibility is assessed based on the displayed log-luminance produced by tone-curves $b_{tm}$, while the noise depends on the log-luminance of the input image. e is an optional local-contrast enhancement parameter, which enables boosting details and thus creative control. The "min" term in the equation effectively reduces contrast whenever the amplitude of noise is above the detection threshold, which corresponds to the case when the magenta line of noise amplitude in FIG. 2 is above the visibility thresholds, shown as the blue line.

The combining submodule 136 receives one or more contextual parameters that affect the combining of the base layer and detail layer. These parameters include one or more of properties of noise from the noise model and properties of the display model, such as peak luminance, contrast and ambient reflectance.

The inverse display modelling submodule 140 further builds the display model based on at least peak luminance, contrast/back levels, ambient reflectance, ambient light. The inverse display modelling may be further based on the size and orientation of the local regions used for generating local tone-curves, which is a user-defined parameter.

Figure 17:
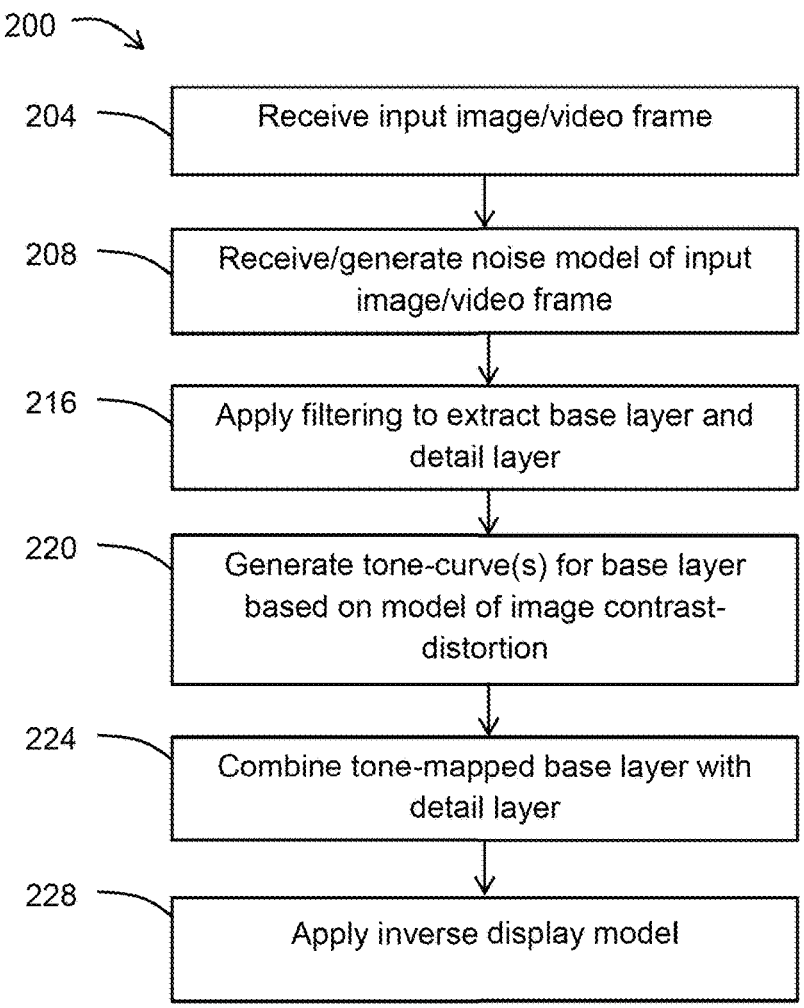
FIG. 17 illustrates a flowchart of the operational steps of a method for tone-mapping an input image according to one example embodiment.

Referring now to FIG. 17, therein illustrated is a flowchart of the operational steps of a method for tone-mapping according to one example embodiment.

At step 204, the input image or video 108 is received.

At step 208, a noise model of the input image or video 108 is received or generated. For example, the noise model may be generated according to details provided herein with reference to the noise modeling module 116.

At step 216, filtering is applied to extract a base layer and a detail layer of the input image or video 108. For example, the filtering may be the edge-stop spatial filtering described herein with reference to the filtering submodule 128.

At step 220, one or more tone-curves (ex: a global tone-curve and/or a plurality of local tone-curves) are generated for the base layer and the base layer is tone mapped. For example, the one or more tone-curves may be generated based on the model of image contrast distortion as described herein with reference to the tone-curve generating submodule 132.

At step 224, the tone-mapped base layer and detail layer are combined. For example, the combining may apply scaling based on the presence of noise as described herein with reference to the combining submodule 136.

At step 228, an inverse display model may optionally be applied based on contextual parameters and parameters of the display device.

Results and Applications

In this section an overview of the tone-mapping system and method described herein according to various example embodiments is presented in terms of visual quality, performance and features. Specific features, including noise awareness, adaptation to display and viewing conditions, and detail enhancement, are also discussed to demonstrate how tone-mapping system and method described herein according to various example embodiments can be applied in the context of a set of common imaging applications.

Figure 9:
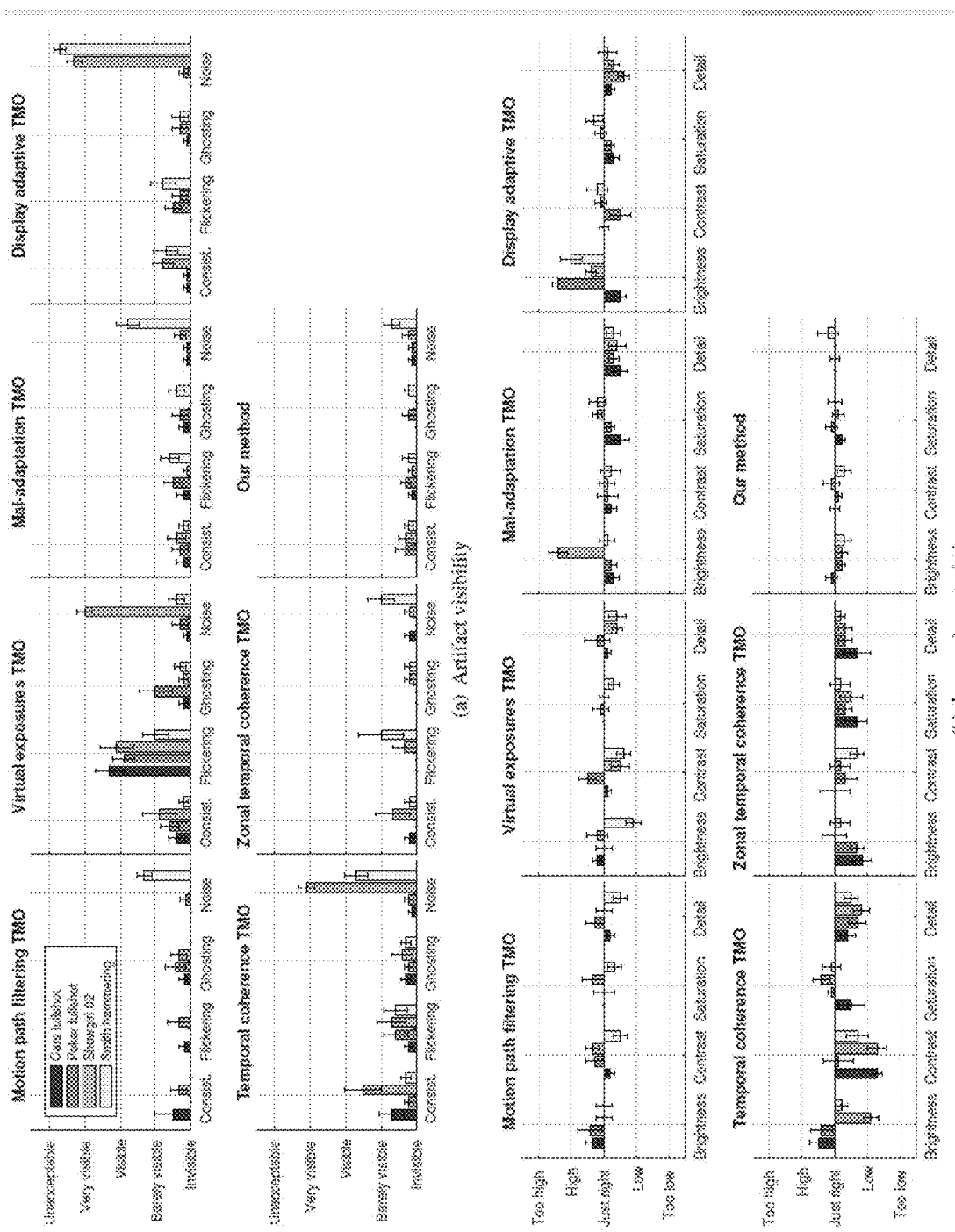
FIG. 9 show graphs of qualitative analysis results, showing the average ratings from the conducted experiment, with error bars for the standard errors.

Results and evaluation: To evaluate the performance of an implementation of tone-mapping system and method described herein in terms of visual quality, a subjective evaluation was performed as a qualitative analysis experiment. The experiment compared the implementation of the tone-mapping system and method described herein to six state-of-the-art video tone-mapping methods; two global operators: Mal-adaptation TMO [Irawan et al. 2005] and Display-adaptive TMO [Mantiuk et al. 2008], and four local operators: Virtual exposures TMO [Bennett and McMillan 2005], Temporal coherence TMO [Boitard et al. 2012], Zonal temporal coherence TMO [Boitard et al. 2014] and Motion path filtering TMO [Aydin et al. 2014]. The evaluation was carried out as a rating experiment where 10 users experienced in image processing viewed, in random order, a set of video clips. These were taken from [Froehlich et al. 2014], and were each tone-mapped with the seven operators. The users were asked to provide ratings for each clip according to the following attributes: overall brightness, overall contrast, overall color saturation, temporal color consistency, temporal flickering, ghosting, excessive noise, as well as detail reproduction to assess the contrast at a local level. The final result of the ratings, averaged over the observers, is illustrated in FIG. 9 for the different sequences. Overall it was observed that the tone-mapping system and method described herein consistently produces results that show image characteristics at about just the right level without visible artifacts.

Figure 10:
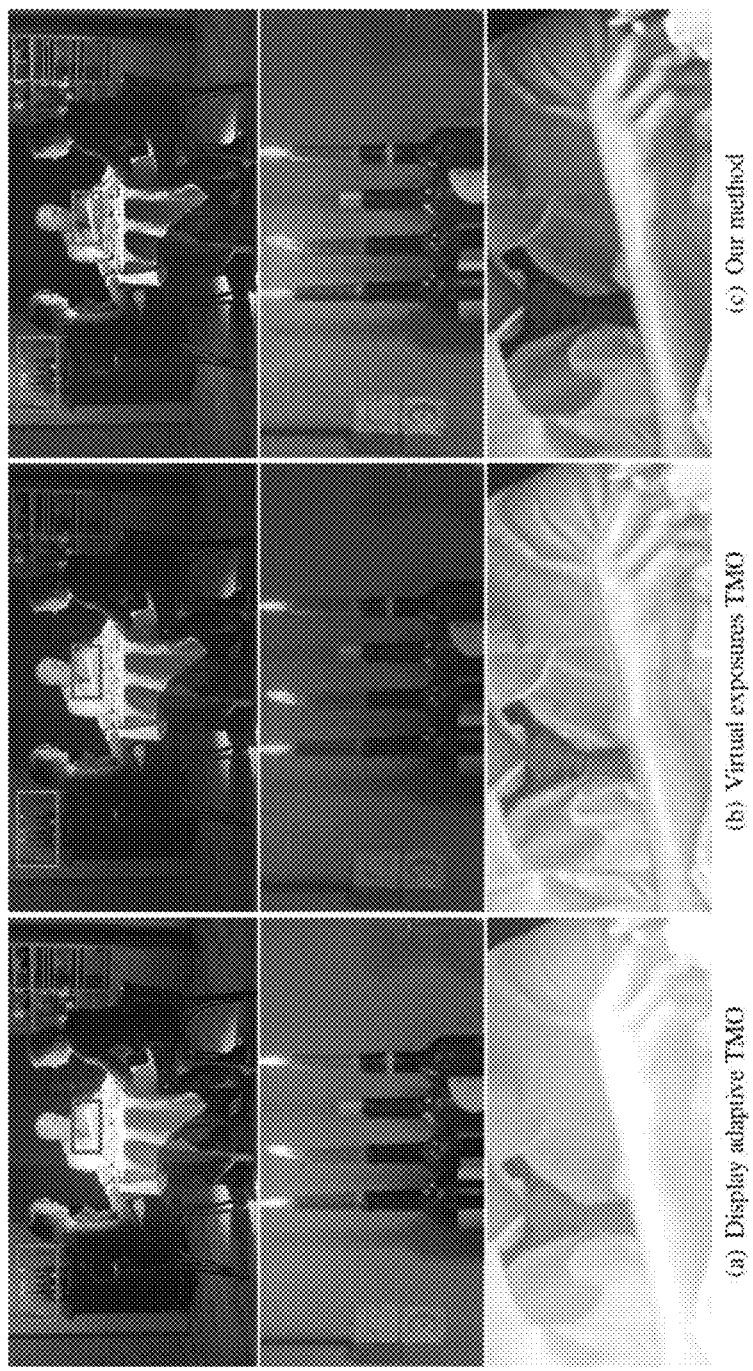
FIG. 10 shows a representative example between two current state-of the art TMOs and the real-time contrast distortion-based TMO described herein.

FIG. 10 shows a representative example of a visual comparison between the real-time contrast distortion-based TMO described herein and two state-of-the-art TMOs taken from the user evaluation. The figure compares the implementation tone-mapping system and method described herein to the best performing TMO from the evaluation in [Eilertsen et al. 2013], display adaptive TMO [Mantiuk et al. 2008], and virtual exposures TMO [Bennett and McMillan 2005]. The magnifications show examples of the tone-mappings in low and high luminance areas, respectively. The display adaptive TMO, which relies on global processing, shows problems in compressing the large dynamic range in the scene which leads to bright results and loss of local details and contrast. The virtual exposures TMO relies on bilateral filtering which in some situations leads to ringing artifacts along edges. There are also problems in adapting the tone-curve over time, resulting in disturbing temporal flickering (see FIG. 9). Compared to these TMOs, real-time contrast distortion-based TMO described herein handles the dynamic range in the scene very well and preserves local detail and contrast without any artifacts.

Figure 11:
FIG. 11 shows the results of two current TMOs and an implementation of the real-time contrast distortion-based TMO described herein.

FIG. 11 shows the result of the method from [Aydin et al. 2014] using different tone-curves. In 11a and 11b the tone-curves are the same as used in the original article (i.e. log scaling and log map-ping from [Drago et al. 2003]), and in 11c an implementation of the real-time contrast distortion-based TMO described herein was used. Although the overall filtering employed by Aydin et al. shows good performance in terms of visible artifacts (see FIG. 9) the actual tone reproduction and temporal processing of the tone-curve are not considered. From the Figure it is clear that the implementation of real-time contrast distortion-based TMO described herein exhibits a better compression of the dynamic range while preserving the local contrasts. Also, the optical flow filtering used may not work well in complicated image transitions (see e.g. the noise level in the smith hammering sequence in FIG. 10). Finally, due to the filtering process, the method is computationally expensive and not suited for real-time applications.

Performance

All steps in the real-time contrast distortion-based TMO described herein described herein can be computed in parallel and are suitable for GPU implementation. The spatial filtering is constructed using separable low-pass filters, together with horizontal and vertical gradient filters. This means that only four 1D filter kernels need to be run at each iteration of the diffusion process. The local histogram calculation and the temporal filtering of the tone-curves are trivially parallel. All parts of the tone-mapping system and method described herein were implemented using CUDA 6.5. With a modern graphics card, the complete TMO pipeline runs in real-time on full high definition material. Table 2 shows the performance of the implementation of the real-time contrast distortion-based TMO using 720p and 1080p HD input running on a GeForce GTX 980.

|  | 1280 × 720 px | 1920 × 1080 px |
| --- | --- | --- |
| Detail extraction (ms) | 7.19 | 17.1 |
| Tone curve (ms) | 1.62 | 3.31 |
| Total time (ms) | 9.18 | 21.5 |
| Framerate (fps) | 109 | 46.5 |

Applications and Features

Figure 12:
FIG. 12 illustrates the results of using a global tone-curve, natural details and strongly enhanced details and use of tone-priority setting.

Video postprocessing: When video requires color-grading, tone-mapping system and method described herein offer both high quality automatic adjustment, and a range of creative contrast controls for stylization. Especially attractive is detail enhancement, which can maintain or strongly increase detail visibility without noticeable artifacts (FIG. 12 top). This is shown in FIG. 12 top-left and top-center, where the results of global tone-mapping are compared with the image in which the detail layer was preserved at the original contrast. Tone-priority adjustment allows to shift focus between darker and brighter tones while minimizing distortions, such as clipping, without the complication of controlling the exact shape of a tone-curve (FIG. 12 bottom). Because the operation can be run at real-time frame-rates, visual feedback is provided at full resolution as a particular parameter is adjusted. Because focus is put on contrast and color issues are not considered, tone-mapping system and method described herein can be combined with existing solutions to address all aspects of color-grading.

Figure 13:
FIG. 13 illustrates a comparison between a naïve tone-mapping operator which leads to amplification of image noise and tone-mapping from the real-time contrast distortion-based TMO described herein.
Figure 14:
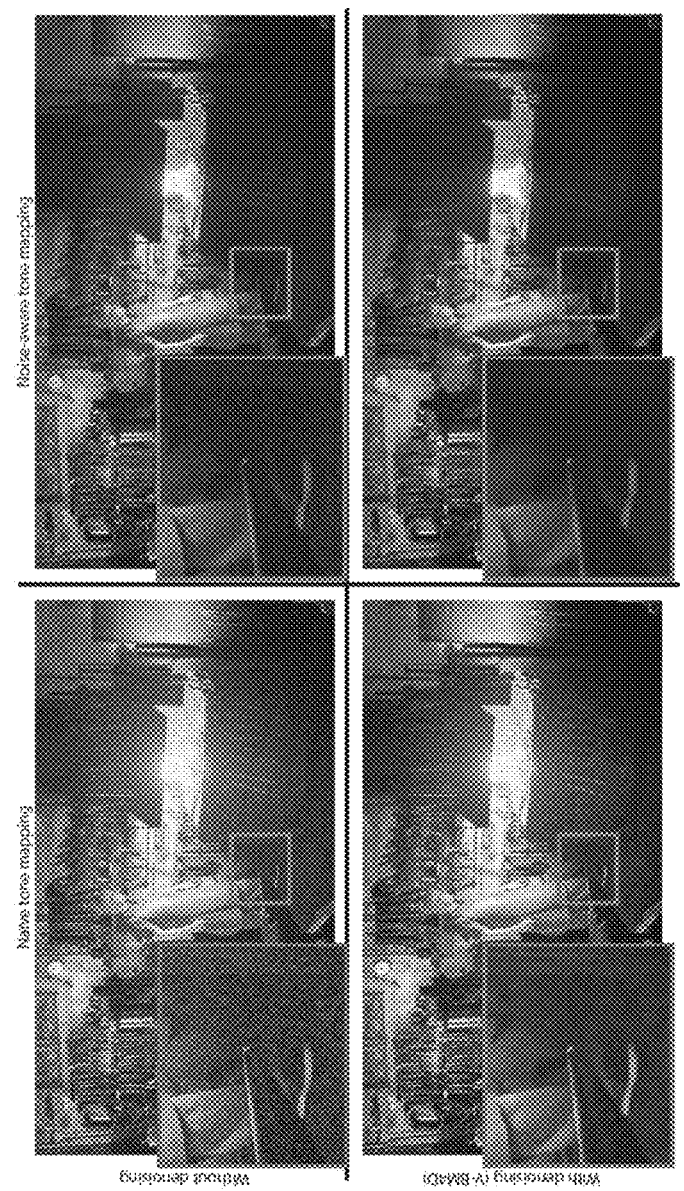
FIG. 14 illustrates of comparisons of tone-mapping operators that disregard noise with the real-time contrast distortion-based TMO that is noise aware.

In-camera processing stacks: Images captured by sensors need to go through a chain of operations, such as demosaicing, denoising and sharpening, before they can be displayed on a digital viewfinder or stored as (JPEG) images or (MPEG) movies. A key operation in this chain is tone-mapping, in which the larger dynamic range of the sensor is mapped into a smaller dynamic range supported by a display or an output image file format. Tone-mapping system and method described herein is well suitable for that purpose as it offers automatic tone-mapping and detail enhancement, which adapts to camera noise levels. FIGS. 13 and 14 show the result of tone-mapping with and without noise-aware processing. To reduce noise visibility, enhancement is reduced in noisy image regions and most of the sensor read-out noise is hidden in the darker image tones. However, if the preview of noise levels is desirable, for example in digital viewfinder, noise-aware processing can be disabled, as shown in the top left in FIGS. 13 and 14. To underline that the noise-aware tone reproduction does not actually compete with denoising, FIG. 14 also show the result of applying a state-of-the-art denoising method (V-BM4D, [Maggioni et al. 2012]). The denoising step is performed in the log domain, before the tone-mapping. Without the noise-aware capabilities, artifacts from the denoising are clearly visible, while when complementing the both methods these are hidden in the darker tones of the image.

Figure 15:
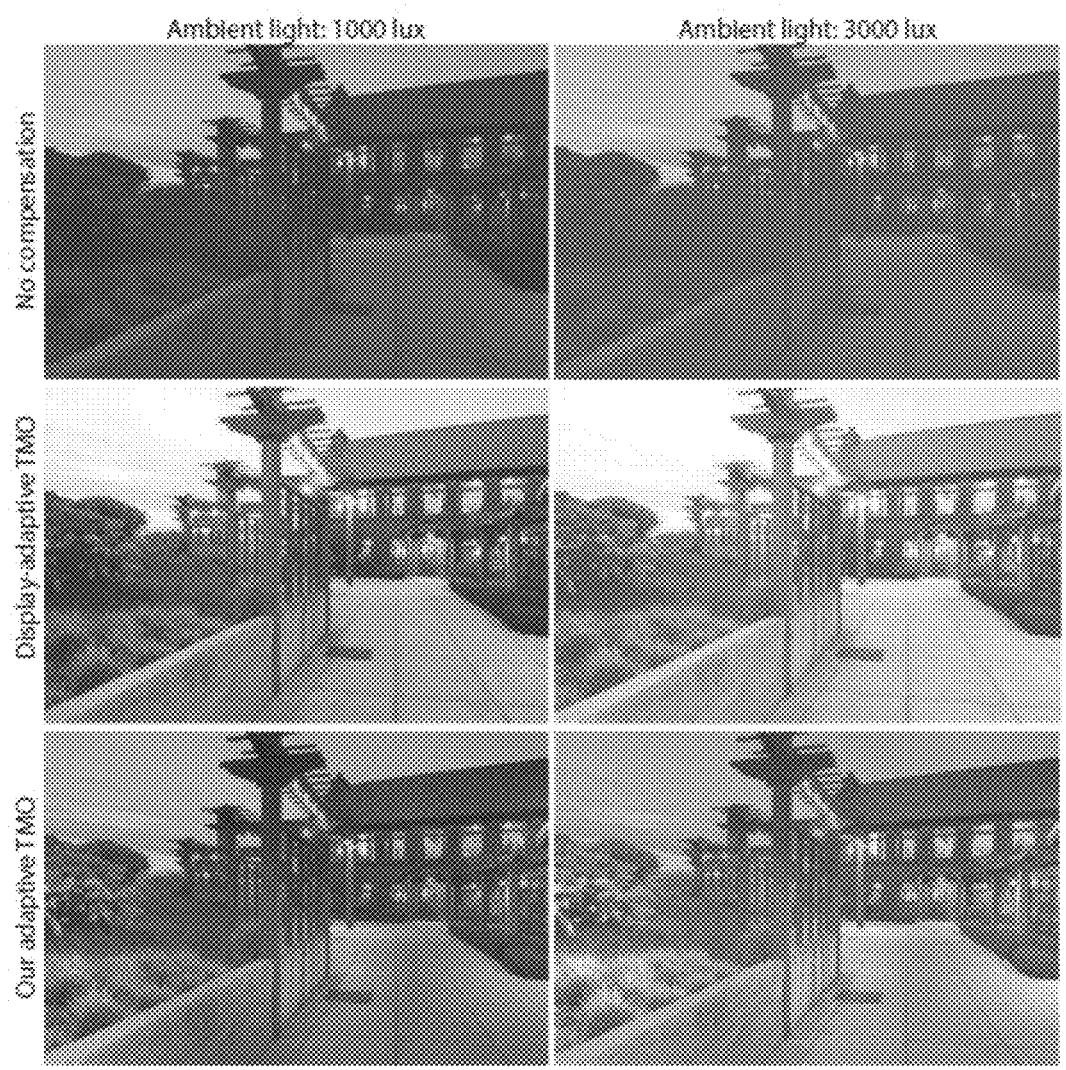
FIG. 15 illustrates results where ambient light is introduced during tone-mapping.

Display algorithms for ambient light compensation: The effective contrast of a display strongly depends on ambient light levels. When a mobile device is used in sunlight, an emissive display (LCD, OLED) is hardly legible since light reflected from the screen reduces its contrast. The usual remedy is to increase screen bright-ness, but this strongly increases power consumption. Another approach is to tone-map the content shown on the display to adapt to the effective image contrast in particular viewing conditions. This is shown in FIG. 15, in which the top row shows non-adapted images and bottom row adapted images. The content is clearly more visible and exhibit an overall better quality in the latter case. When compared to the display adaptive tone-mapping proposed in [Mantiuk et al. 2008] (middle row), tone-mapping system and method described herein results in better contrast and detail visibility thanks to its local processing.

Throughout the paper, HDR-video input from the publicly available database from [Froehlich et al. 2014] is. This dataset is suitable for evaluation of tone-mapping operators, as it contains high quality footage captured in realistic scenarios

Conclusion

Example embodiments of a novel real-time contrast distortion-based TMO and elements thereof are described herein. Advantageously, system and methods for generating the tone-curve described herein does not need to numerically solve quadratic programming. In contrast to existing ad-hoc methods, such as histogram equalization, the real-time contrast distortion-based TMO solves a well-defined minimization problem. The local tone-curves dynamically adapt to image content, noise levels and display capabilities, including the compensation for ambient light. A novel edge-stop filter is also described as an element of the real-time contrast distortion-based TMO. This filter is designed for preserving and enhancing details in tone-mapping. It avoids overshooting and ringing artifacts on soft edges, which is a common problem with most filters used in tone-mapping, in particular when detail enhancement is required. Since the filter can be implemented as iterative Gaussian blurring, it leads to an efficient hardware implementation. Finally, both of the above described aspects are combined in a comprehensive video tone-mapping operator, which controls the visibility of noise and adapts to a display and ambient light.

The real-time contrast distortion-based TMO addresses scene reproduction and best subjective quality. Higher quality tone-mapping could potentially be achieved with advanced denoising methods or by analyzing the entire length of the movie sequence, although this cause the TMO to no longer be in real-time.

Although tone-mapping is usually seen as a high dynamic range problem, in practice it has a much broader field of applications. When a display is seen at high ambient light levels and its effective contrast is reduced, even low dynamic range content may benefit from tone-mapping. Some mobile devices already incorporate such compensation algorithms. Many camera sensors capture higher physical contrast than a display (or a digital viewfinder) can reproduce. Therefore, tone-mapping is an essential component in any in-camera processing stack, even if a single exposure (LDR) is captured. Finally, it is important to recognize that in many applications the images need to be reproduced based on the desire of an artist. Tone-mapping operators used in such applications need to offer creative control parameters, which are easy to manipulate and can be explored with real-time visual feedback.

Various examples of the real-time contrast distortion-based TMO described herein provide for controlling the visibility of the noise, adapting to the display and viewing environment, minimizing contrast distortions, preserving or enhancing image details, and can be run in real-time on an incoming sequence without any preprocessing. The intent is to either preserve the contrast in the original image given the constraints of a target display, or to provide creative controls for contrast enhancement, with a real-time full-resolution visual feedback of the final result.

Technical contributions provided by various example embodiments described herein include:
- A fast procedure for computing local display-adaptive tone-curves that minimize contrast distortion.
- Noise-aware tone-curves adaptive to image noise.
- Filter design for base-detail layer decomposition for tone-mapping, leading to a fast edge-stopping non-linear diffusion approximation for detail enhancement without ringing artifacts.
- An integrated, real-time video tone-mapping solution, which combines the novel noise control with display-adaptivity to produce high contrast and detailed video given the display limitations.

Several alternative embodiments and examples have been described and illustrated herein. The embodiments of the invention described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while specific embodiments have been illustrated and described, numerous modifications come to mind without significantly departing from the scope of the invention as defined in the appended claims.

Acknowledgments

We would like to thank the volunteers who participated in the experiment. We also thank Jan Frohlich" et al. for the HDR video sequences used throughout the paper (https://hdr-2014.hdm-stuttgart.de), and Ronan Boitard for implementations of the temporal coherence TMOs used in the evaluation.

This project was funded by the Swedish Foundation for Strategic Research (SSF) through grant IIS11-0081, Linkoping" University Center for Industrial Information Technology (CENIIT), the Swedish Research Council through the Linnaeus Environment CADICS, and through COST Action IC1005.

Appendix A: Derivation of Tone-Curve Slopes

This appendix shows how the optimum slopes (Equation 14) can be found analytically from Equation 13 using the KTT method. Considering for now only the equality condition of the second constraint (Equation 12). Minimizing $\varepsilon'(s_k)$ with this constraint is equivalent to minimizing the functional:

$$\sum_k p(l_k)(1 - s_k)^2 + \lambda \left( \sum_{k=1}^{N} s_k - \frac{r}{\delta} \right) \quad (29)$$

where $\lambda$ is the Lagrange multiplier. This functional is minimized by solving the system of equations:

$$\begin{cases} -2(1 - s_1)p_1 + \lambda = 0 \\ -2(1 - s_2)p_2 + \lambda = 0 \\ \vdots \\ -2(1 - s_N)p_N + \lambda = 0 \\ \sum_{k=1}^{N} s_i - \frac{r}{\delta} = 0 \end{cases} \quad (30)$$

The $\lambda$ variable can be eliminated by combining any two equations except the last to get:

$$(1 - s_k)p_k = (1 - s_i)p_i \Rightarrow s_i = 1 - \frac{(1 - s_k)p_k}{p_i}$$

After introducing the above equation to the last line of Equation 30, the solution is in Equation 14.

Appendix B: Slopes of Histogram Equalization

By reversing the steps performed to derive the slope allocation formula, it is possible to find the hypothetical objective function for histogram equalization, which is:

$$\varepsilon_{HE}(s_k) = \sum_{k=1}^{N} p(l_k) \log(s_k)$$

subject to the same constraints as in Equation 12, with the difference that the functional is maximized and not minimized. The solution of the above equation results in the slopes given by Equation 22. The formulation is not ideal as there is a singularity at $s_k=0$, which needs to be handled as a special condition, which we omit here for clarity. The objective function shows that the histogram equalization procedure distributes the logarithms of slopes according to the probability of each bin k. This means that the tone-curve slopes are exponentially related to the probability values $p(l_k)$. Such relation often results in assigning very high slopes to the bins with high probabilities, which is undesirable in most tone-mapping applications.

Appendix C: Analysis of Detail Extraction Artifacts

Figure 16:
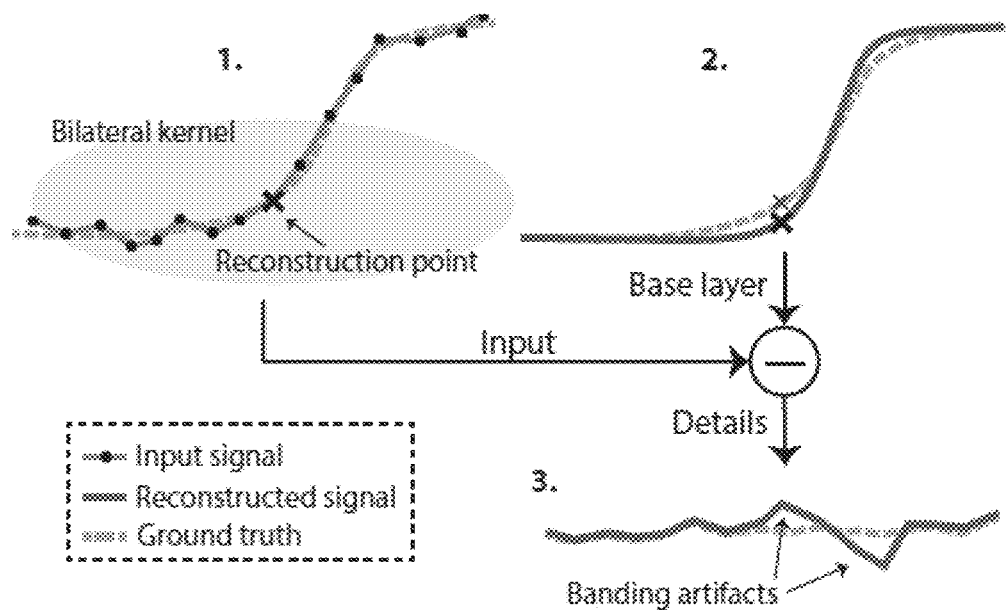
FIG. 16 illustrates the bias when filtering a point near an edge.

Many bilateral filter extensions and acceleration schemes, such as [Durand and Dorsey 2002; Chen et al. 2007; Adams et al. 2009; Adams et al. 2010; Baek and Jacobs 2010; Yoshizawa et al. 2010; Banterle et al. 2012; Yang 2012], make real-time processing fully possible. However, the filters that assume a piece-wise constant underlying signal, such the bilateral and anisotropic diffusion [Perona and Malik 1990], fail to correctly reconstruct complex spatial intensity transitions in natural images [Takeda et al. 2007b]. This effect is illustrated in FIG. 16 where the filter kernel is biased towards one side of a smooth edge (edges in natural images are band limited due to the area sampling at sensor pixels). In the reconstruction, this bias and the assumption of a piece-wise constant signal leads to over-sharpening. The resulting reconstruction artifacts can in many applications be accepted as visually insignificant. For the task of detail extraction, however, this over-sharpening causes non-negligible banding or ringing effects (see for example FIGS. 8b and 9a), especially if the details are artistically enhanced.

One way to alleviate these problems is to reconstruct the underlying base layer using higher order approximations, e.g. the trilateral filter, kernel regression, or local polynomial approximations [Takeda et al. 2007a; Katkovnik et al. 2006; Milanfar 2013]. However, this comes at the cost of significantly increased complexity which makes real-time evaluation on high resolution footage difficult and in most cases even impossible. These higher order filters also tend to be sensitive to the parameter settings.

Another common option for edge-preserving filtering are the diffusion based algorithms. Anisotropic non-linear diffusion was introduced by Perona and Malik [1990], and bears many resemblances with bilateral filtering. Specific unified formulations of anisotropic diffusion and bilateral filtering have also been shown in e.g. [Barash 2002] and [Durand and Dorsey 2002]. Since this filter also relies on a piece-wise constant assumption, the output is prone to show in-consistent behavior along edges similarly to the bilateral filter (see FIG. 9b).

REFERENCES

ADAMS, A., GELFAND, N., DOLSON, J., AND LEVOY, M. 2009. Gaussian kd-trees for fast high-dimensional filtering. *ACM Trans. Graphics* 28, 3, 21:1-21:12.

ADAMS, A., BAEK, J., AND DAVIS, M. 2010. Fast High-Dimensional Filtering Using the Permutohedral Lattice. *Computer Graphics Forum* 29, 2, 753-762.

ALLRED, S., RADONJIC', A., AND GILCHRIST, A. 2012. Lightness perception in high dynamic range images: Local and remote luminance effects. *Journal of Vision* 12, 2, 1-16.

AUBRY, M., PARIS, S., HASINOFF, S. W., KAUTZ, J., AND DURAND, F. 2014. Fast local laplacian filters: Theory and applications. *ACM Trans. Graphics* 33, 5, 167:1-167:14.

AURICH, V., AND WEULE, J. 1995. Non-linear gaussian filters performing edge preserving diffusion. In *DAGM-Symposium*, Springer, G. Sagerer, S. Posch, and F. Kummert, Eds., Informatik Aktuell, 538-545.

AYDIN, T. O., STEFANOSKI, N., CROCI, S., GROSS, M., AND SMOLIC, A. 2014. Temporally coherent local tone-mapping of HDR video. *ACM Trans. Graphics* 33, 6, 1-13.

BAEK, J., AND JACOBS, D. E. 2010. Accelerating spatially varying gaussian filters. *ACM Trans. Graphics* 29, 6, 169:1-169:10.

BANTERLE, F., CORSINI, M., CIGNONI, P., AND SCOPIGNO, R. 2012. A low-memory, straightforward and fast bilateral filter through subsampling in spatial domain. *Computer Graphics Forum* 31, 1, 19-32.

BARASH, D. 2002. Fundamental relationship between bilateral filtering, adaptive smoothing, and the nonlinear diffusion equation. *IEEE Trans. Pattern Analysis and Machine Intelligence* 24, 6, 844-847.

BENNETT, E. P., AND MCMILLAN, L. 2005. Video enhancement using per-pixel virtual exposures. *ACM Trans. Graphics* 24, 3, 845-852.

BERNS, R. S. 1996. Methods for characterizing CRT displays. *Displays* 16, 4, 173-182.

BLACK, M. J., SAPIRO, G., MARIMONT, D. H., AND HEEGER, D. 1998. Robust anisotropic diffusion. *Trans. Image Processing* 7, 3, 421-432.

BOITARD, R., BOUATOUCH, K., COZOT, R., THOREAU, D., AND GRUSON, A. 2012. Temporal coherency for video tone-mapping. In *Proc. SPIE* 8499, Applications of Digital Image Processing XXXV, 84990D-84990D-10.

BOITARD, R., COZOT, R., THOREAU, D., AND BOUATOUCH, K. 2014. Zonal brightness coherency for video tone-mapping. *Signal Processing: Image Communication* 29, 2, 229-246.

CHEN, J., PARIS, S., AND DURAND, F. 2007. Real-time edge-aware image processing with the bilateral grid. *ACM Trans. Graphics* 26, 3, 103:1-103:9.

CHOUDHURY, P., AND TUMBLIN, J. 2003. The trilateral filter for high contrast images and meshes. In *Proc. Eurographics workshop on Rendering* 14, 186-196.

DRAGO, F., MYSZKOWSKI, K., ANNEN, T., AND CHIBA, N. 2003. Adaptive logarithmic mapping for displaying high contrast scenes. *Computer Graphics Forum* 22, 419-426.

DURAND, F., AND DORSEY, J. 2002. Fast bilateral filtering for the display of high-dynamic-range images. *ACM Trans. Graphics* 21, 3, 257-266.

EILERTSEN, G., WANAT, R., MANTIUK, R. K., AND UNGER, J. 2013. Evaluation of Tone-mapping Operators for HDR-Video. Computer Graphics Forum 32,7,275-284.

FOI, A., TRIMECHE, M., KATKOVNIK, V., AND EGIAZARIAN, K. 2008. Practical poissonian-gaussian noise modeling and fitting for single-image raw-data. *IEEE Trans. Image Processing* 17, 10,1737-1754.

FROEHLICH, J., GRANDINETTI, S., EBERHARDT, B., WALTER, S., SCHILLING, A., AND BRENDEL, H. 2014. Creating Cine-matic Wide Gamut HDR-Video for the Evaluation of Tone-mapping Operators and HDR-Displays. In *Proc. SPIE* 9023, Digital Photography X, 90230X-90230X-10.

IRAWAN, P., FERWERDA, J. A., AND MARSCHNER, S. R. 2005. Perceptually based tone-mapping of high dynamic range image streams. In *Proc. Eurographics Conference on Rendering Techniques* 16, 231-242.

KATKOVNIK, V., KATKOVNIK, V., EGIAZARIAN, K., AND ASTOLA, J. 2006. Local Approximation Techniques in Signal and Image Processing. Press Monographs. SPIE Press.

KISER, C., REINHARD, E., TOCCI, M., AND TOCCI, N. 2012. Real time automated tone-mapping system for HDR video. In Proc. IEEE International Conference on Image Processing 19, 2749-2752.

KRONANDER, J., GUSTAVSON, S., BONNET, G., AND UNGER, J. 2013. Unified HDR reconstruction from raw CFA data. In *Proc. IEEE International Conference on Computational Photography* 5, 1-9.

LEDDA, P., SANTOS, L. P., AND CHALMERS, A. 2004. A local model of eye adaptation for high dynamic range images. In Proc. International Conference on Computer Graphics, Virtual Reality, Visualisation and Interaction in Africa 3,151-160.

MAGGIONI, M., BORACCHI, G., FOI, A., AND EGIAZARIAN, K. 2012. Video denoising, deblocking, and enhancement through separable 4-d nonlocal spatiotemporal transforms. *IEEE Trans. Image Processing* 21, 9,3952-3966.

MAI, Z., MANSOUR, H., MANTIUK, R., NASIOPOULOS, P., WARD, R., AND HEIDRICH, W. 2011. Optimizing a tone-curve for backward-compatible high dynamic range image and video compression. *IEEE Trans. Image Processing* 20, 6, 1558-1571.

MANTIUK, R., DALY, S., AND KEROFSKY, L. 2008. Display adaptive tone-mapping. *ACM Trans. Graphics* 27, 3, 68:1-68:10.

MANTIUK, R., MANTIUK, R. K., TOMASZEWSKA, A., AND HEIDRICH, W. 2009. Color correction for tone-mapping. *Computer Graphics Forum* 28, 2, 193-202.

MANTIUK, R., KIM, K. J., REMPEL, A. G., AND HEIDRICH, W. 2011. Hdr-vdp-2: A calibrated visual metric for visibility and quality predictions in all luminance conditions. *ACM Trans. Graphics* 30, 4, 40:1-40:14.

MILANFAR, P. 2013. A tour of modern image filtering: New insights and methods, both practical and theoretical. *IEEE Signal Processing Magazine* 30, 1, 106-128.

PATTANAIK, S. N., TUMBLIN, J., YEE, H., AND GREENBERG, D. P. 2000. Time-dependent visual adaptation for fast realistic image display. In *Proc. SIGGRAPH* 00, Annual Conference Series, 47-54.

PERONA, P., AND MALIK, J. 1990. Scale-space and edge detection using anisotropic diffusion. *IEEE Trans. Pattern Analysis Machine Intelligence* 12, 7,629-639.

REINHARD, E., AND DEVLIN, K. 2005. Dynamic range reduction inspired by photoreceptor physiology. *IEEE Trans. Visualization and Computer Graphics* 11, 1, 13-24.

TAKEDA, H., FARSIU, S., AND MILANFAR, P. 2007. Kernel regression for image processing and reconstruction. *IEEE Trans. Image Processing* 16, 2, 349-366.

TAKEDA, H., FARSIU, S., AND MILANFAR, P. 2007. Higher order bilateral filters and their properties. *Proc. SPIE* 6498, Computational Imaging V, 64980S-64980S-9.

TOCCI, M. D., KISER, C., TOCCI, N., AND SEN, P. 2011. A versatile hdr video production system. ACM Trans. Graphics 30, 4, 41:1-41:10.

TOMASI, C., AND MANDUCHI, R. 1998. Bilateral filtering for gray and color images. In *Proc. International Conference on Computer Vision* 6, 839-846.

VAN HATEREN, J. H. 2006. Encoding of high dynamic range video with a model of human cones. *ACM Trans. Graphics* 25, 1380-1399.

WARD LARSON, G., RUSHMEIER, H., AND PIATKO, C. 1997. A visibility matching tone reproduction operator for high dynamic range scenes. *IEEE Trans. Visualization and Computer Graphics* 3, 4, 291-306.

YANG, Q. 2012. Recursive bilateral filtering. In *Proc. European Conference on Computer Vision* 12, 399-413.

YOSHIZAWA, S., BELYAEV, A. G., AND YOKOTA, H. 2010. Fast gauss bilateral filtering. *Computer Graphics Forum* 29, 1, 60-74.

The invention claimed is:

1. A method for filtering an input image to generate a base layer and a detail layer, the method comprising:
    applying a spatial filter to the input image to generate the base layer and the detail layer, the filtering comprising for each of a plurality of pixels:
        detecting the presence of an edge of the input image within a region surrounding the pixel; and
        selectively applying a filtering kernel to the region based on the presence of the edge within the region.

2. The method of claim 1, wherein the spatial filter is applied iteratively, the size of the filtering kernel being increased in each iteration;
    wherein the flow of filtering across iterations for a given pixel is stopped upon determining a gradient within the region surrounding the given pixel being greater than a predetermined edge threshold representing the presence of an edge within the region.

3. A method for tone mapping the input image to generate a tone-mapped output image, the method comprising:
    a) filtering the input image according to claim 1;
    b) tone-mapping the base layer; and
    c) combining the detail layer and the tone-mapped base layer.

4. The method of claim 3, further comprising modulating the detail layer based on a visibility threshold; and
    wherein the modulated detail layer is combined with the tone-mapped base layer.

5. A context-aware tone-mapping operator for tone-mapping an input image, the operator comprising:
    a) a noise model generator configured to generate a noise model of the input image;
    b) a tone-mapping module operable to receive one or more contextual parameters, the tone-mapping module comprising:
        i) an edge stopping filtering submodule for extracting a base layer of the input image and a detail layer of the input image according to the method of claim 1;
        ii) a tone-curve generating submodule for tone mapping the base layer of the input image based on the noise model of the input image; and
        iii) a combining submodule for combining the tone-mapped base layer and the detail layer;
    c) wherein at least one of the edge stopping filtering submodule, the tone-curve generating submodule and the combining submodule is adjustable based on at least one of the one or more contextual parameters.

6. The tone-mapping operator of claim 5, wherein the contextual parameters comprise one or more of a viewer characteristic, ambient light, peak luminance of an output display device, ambient reflectance, dynamic range of the output display device, user-defined parameters, speed and exposure.

7. The tone-mapping operator of claim 5, wherein the contextual parameters comprise one or more of ambient light, peak luminance of an output display device, dynamic range of the output display device and exposure; and
    wherein the tone-curve generating submodule determines an effective output dynamic range based on the one or more of the ambient light, the peak luminance and dynamic range and generates a tone-curve for tone mapping the base layer based on the effective output dynamic range.

8. The tone-mapping operator of claim 5, wherein the contextual parameters comprise viewer characteristic; and
    wherein the combining submodule modulates the detail layer based on the viewer characteristic and combines the base layer with the modulated detail layer.

9. The tone-mapping operator of claim 8, wherein the contextual parameters comprise viewer preferences; and
    wherein the tone-curve generating submodule generates a tone-curve for tone-mapping based on the viewer preferences.

10. The tone-mapping operator of claim 5, wherein the contextual parameters comprise speed; and
    wherein the edge stopping filter submodule is configured to apply a number of iterations according to the speed.

11. The tone-mapping operator of claim 5, wherein the contextual parameters comprise viewer preferences; and
    wherein the tone-curve generating submodule generates a tone-curve for tone-mapping based on the viewer preferences and the combining submodule modulates the detail layer based on the viewer preferences and combines the base layer with the modulated detail layer.

12. A computer-implemented system for filtering an input image to generate a base layer and a detail layer, the system comprising:
    at least one data storage device; and
    at least one processor coupled to the at least one storage device, the at least one processor being configured for:
    filtering the input image according to claim 1;
    tone-mapping the base layer; and
    combining the detail layer and the tone-mapped base layer.

13. The system of claim 12, wherein the at least one processor is further configured for modulating the detail layer based on a visibility threshold; and
    wherein the modulated detail layer is combined with the tone-mapped base layer.

14. A computer-implemented system for filtering an input image to generate a base layer and a detail layer, the system comprising:
    at least one data storage device; and
    at least one processor coupled to the at least one storage device, the at least one processor being configured for:
    applying a spatial filter to the input image to generate the base layer and the detail layer, the filtering comprising for each of a plurality of pixels:
        detecting the presence of an edge of the input image within a region surrounding the pixel; and
        selectively applying a filtering kernel to the region based on the presence of the edge within the region.

15. The system of claim 14, wherein the spatial filter is applied iteratively, the size of the filtering kernel being increased in each iteration;
    wherein the flow of filtering across iterations for a given pixel is stopped upon determining a gradient within the region surrounding the given pixel being greater than a predetermined edge threshold representing the presence of an edge within the region.

* * * * *